(12) United States Patent
Zinger et al.

(10) Patent No.: US 11,959,809 B2
(45) Date of Patent: *Apr. 16, 2024

(54) SYSTEMS, METHODS AND DEVICES FOR OBTAINING FEEDBACK INFORMATION TO REVEAL GROUP PREFERENCES

(71) Applicant: Cognian Technologies, Ltd., North Ryde (AU)

(72) Inventors: Vicheslav Zinger, Alexandria (AU); Gary Aitchison, Alexandria (AU)

(73) Assignee: Cognian Technologies, Ltd., North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,083

(22) Filed: Apr. 29, 2022

(65) Prior Publication Data
US 2022/0357208 A1 Nov. 10, 2022

Related U.S. Application Data

(63) Continuation of application No. 14/906,244, filed as application No. PCT/AU2014/000734 on Jul. 18, 2014, now Pat. No. 11,359,974.

(Continued)

(51) Int. Cl.
*G06F 16/00* (2019.01)
*G01K 1/02* (2021.01)
(Continued)

(52) U.S. Cl.
CPC ........... *G01K 1/02* (2013.01); *G05D 23/1917* (2013.01); *G06F 16/24573* (2019.01);
(Continued)

(58) Field of Classification Search
None
See application file for complete search history.

(56) References Cited

U.S. PATENT DOCUMENTS 6,144,989 A * 11/2000 Hodjat .................. G06N 5/043
709/202
6,594,684 B1 * 7/2003 Hodjat .................. G06N 5/043
709/202

(Continued)

OTHER PUBLICATIONS

International Search Report and Written Opinion dated Sep. 23, 2014 for PCT/AU2014/000734.

*Primary Examiner* — Farhan M Syed
(74) *Attorney, Agent, or Firm* — Jones Day

(57) ABSTRACT

The present disclosed is directed to systems, methods, and devices for obtaining feedback information from individuals to reveal group preferences and to systems, methods, and devices for enabling providers to provide outcomes which utilize, at least in part, the preferences of the group. For example, a system comprising a plurality of devices, wherein at least one device of the plurality of devices captures at least one feedback in one substantially simple transaction; and the at least one device of the plurality of devices sends the at least one captured feedback to at least one computer; and the at least one computer receives the least one feedback; and the at least one feedback can be given at one or more of the following: periodic time intervals, predefined time intervals, random time intervals, substantially random time intervals and substantially any time.

18 Claims, 18 Drawing Sheets

Related U.S. Application Data

(60) Provisional application No. 61/856,441, filed on Jul. 19, 2013.

(51) Int. Cl.
   *G05D 23/19*        (2006.01)
   *G06F 16/2457*      (2019.01)
   *G06F 16/28*        (2019.01)
   *G06F 16/9535*      (2019.01)
   *H04L 12/28*        (2006.01)

(52) U.S. Cl.
   CPC ...... *G06F 16/24575* (2019.01); *G06F 16/288* (2019.01); *G06F 16/9535* (2019.01); *H04L 12/2829* (2013.01); *H04L 2012/285* (2013.01)

(56) References Cited

U.S. PATENT DOCUMENTS

| | | | | |
|---|---|---|---|---|
| 6,772,190 B2* | 8/2004 | Hodjat | ............. | G06N 5/043 709/202 |
| 7,761,499 B2* | 7/2010 | Hodjat | ............. | G06N 5/043 709/202 |
| 7,849,115 B2* | 12/2010 | Reiner | ............. | G06Q 30/02 707/912 |
| 7,895,076 B2* | 2/2011 | Kutaragi | ............. | A63F 13/525 705/14.43 |
| 8,020,095 B2* | 9/2011 | Braun | ............. | G06F 3/04812 715/702 |
| 8,075,484 B2* | 12/2011 | Moore-Ede | ............. | B60K 28/06 128/920 |
| 8,396,800 B1* | 3/2013 | Wieder | ............. | G06Q 30/02 705/50 |
| 8,406,248 B2* | 3/2013 | Pratt, Jr. | ............. | H04W 56/002 370/444 |
| 8,615,529 B2* | 12/2013 | Reiner | ............. | G16H 15/00 707/790 |
| 8,652,041 B2* | 2/2014 | Moore-Ede | ............. | B60K 28/06 600/300 |
| 9,053,181 B2* | 6/2015 | Wieder | ............. | G06F 16/686 |
| 9,053,299 B2* | 6/2015 | Wieder | ............. | H04L 67/60 |
| 9,098,681 B2* | 8/2015 | Wieder | ............. | H04L 63/0807 |
| 9,645,788 B1* | 5/2017 | Wieder | ............. | H04L 63/0807 |
| 2002/0116350 A1* | 8/2002 | Hodjat | ............. | G06N 5/043 706/11 |
| 2005/0015519 A1* | 1/2005 | Hodjat | ............. | G06N 5/043 710/36 |
| 2006/0200008 A1* | 9/2006 | Moore-Ede | ............. | B60K 28/06 128/920 |
| 2007/0043616 A1* | 2/2007 | Kutaragi | ............. | H04N 21/435 705/14.68 |
| 2007/0282912 A1* | 12/2007 | Reiner | ............. | G16H 15/00 |
| 2009/0010205 A1* | 1/2009 | Pratt, Jr. | ............. | H04W 56/002 370/328 |
| 2009/0289779 A1* | 11/2009 | Braun | ............. | G06F 3/03543 340/407.2 |
| 2010/0262298 A1* | 10/2010 | Johnson | ............. | F24F 11/30 700/277 |
| 2011/0041077 A1* | 2/2011 | Reiner | ............. | A61B 5/411 715/745 |
| 2012/0078063 A1* | 3/2012 | Moore-Ede | ............. | G16H 10/20 600/300 |
| 2014/0195025 A1* | 7/2014 | Wieder | ............. | G06Q 30/02 700/94 |
| 2014/0195026 A1* | 7/2014 | Wieder | ............. | H04L 67/60 700/94 |
| 2014/0195919 A1* | 7/2014 | Wieder | ............. | H04L 63/0807 715/730 |
| 2015/0248219 A1* | 9/2015 | Wieder | ............. | G06F 16/639 715/716 |

* cited by examiner

Key:

★ Temperature Sensor
● Humidity Sensor
◆ Air Pressure sensor
■ A/C Controller
⌒ Door open/Close
ᨆ Window open/close
● Feedback button

SYSTEMS, METHODS AND DEVICES FOR OBTAINING FEEDBACK INFORMATION TO REVEAL GROUP PREFERENCES

CROSS-REFERENCE TO RELATED APPLICATIONS

This application is a continuation of U.S. application Ser. No. 14/906,244, filed Jan. 19, 2016, which is the National Phase of International Application No. PCT/AU2014/000734, filed Jul. 18, 2014, which was published in English, and further claims priority to U.S. Provisional Application No. 61/856,441, entitled "SYSTEMS, METHODS, AND DEVICES FOR OBTAINING FEEDBACK INFORMATION TO REVEAL GROUP PREFERENCES," filed on Jul. 19, 2013. This application is related to U.S. Provisional Application No. 61/700,593, entitled "SYSTEMS, METHODS AND DEVICES FOR NETWORKING OVER A NETWORK," filed on Sep. 13, 2012; U.S. Provisional Application No. 61/794,894, entitled "SYSTEMS, METHODS AND DEVICES FOR NETWORKING OVER A NETWORK," filed on Mar. 15, 2013 and U.S. Provisional Application No. 61/832,466, entitled "SYSTEMS, METHODS AND DEVICES FOR NETWORKING OVER A NETWORK," filed on Jun. 7, 2013. Each of these applications are incorporated herein by reference in their entirety.

FIELD

Embodiments disclosed herein relate to systems, methods, and devices for obtaining feedback information from individuals to reveal group preferences and to systems, methods, and devices for enabling providers to provide outcomes which, utilize, at least in part, the preferences of the group.

BACKGROUND

The ability to observe and act on revealed preferences of a group of individuals is beneficial. For example, in setting the thermostats in an office building, a single degree shift in the temperature setting may save as much as 10% in energy use. Accordingly, if the preference of the group will tolerate a one degree shift in the temperature setting, it would be beneficial to make such a change. However, using preferences of a group of individuals is problematic. It has historically been difficult to convince the individual members of the group to reveal their preferences, and even if the individual preferences are revealed, aggregating the preferences of the individuals to form an acceptable understanding of the preferences of the group has proven difficult. This is due in part to the high transaction costs associated with gathering individual's preferences. People tend not to complain until they are really uncomfortable with a situation. Traditionally, preference information has been collected via surveys that require people to fill out paper work, surveys that require people to enter information onto a computer based form, or direct complaints to the people managing, for example, the HVAC system of a building. These are examples of high transaction cost ways of providing preference feedback.

For example, most buildings are over-cooled and/or over-heated at various times. Studies have shown that a large percentage of people in a building are unhappy or not comfortable with the environmental conditions of the building or a portion of the building. Energy may be often wasted due to the building, or portions of the building, being too hot or too cold for the occupants. A person's preferred temperature may float with the outside temperature and may also depend on the prior weather and what season it is. That is, as the temperature outside gets warmer, so can the preferred temperature. In addition, the previous weather and the season bias these views even further. So there may be no single temperature that is right for a group of people, and it can vary in quite complex ways. However most buildings are preset to one temperature. The result is an almost universal reaction that buildings are over-cooled in summer and over-heated in winter and by several degrees. There is a need in the art for improving the satisfaction level of the occupants of a building. Certain applications of the present disclosure provide methods, systems and/or devices that permit preference information to be collected with a low transaction cost and for the collected information to be used by building owners and/or managers to potentially improve the satisfaction of the occupants and reduce energy usage.

Accordingly, systems, methods, and devices for solving these and other problems disclosed herein are desirable. The present disclosure is directed to overcoming and/or ameliorating at least one of the disadvantages of the prior art as will become apparent from the discussion herein.

SUMMARY

Certain embodiments may provide for a system comprising:
  a plurality of feedback devices for receiving a plurality of preferences from individuals, and the plurality of preferences includes at least one first parameter, wherein the at least one first parameter has one or more of the following properties: observable, measurable, controllable, uncontrollable and unobservable;
  at least one computer or processor;
  at least one second parameter which is measurable; and
  wherein a measured value of the at least one second parameter is received by at least one computer or processor and the plurality of feedback devices are configured to collect preference feedback from at least a portion of the plurality of individuals in substantially real time and at a substantially low transaction cost by permitting individual feedback to be actuated in a single action, wherein the single action may be actuated by an individual of the plurality of individuals during periodic time intervals, predefined time intervals, random time intervals, substantially random time intervals or at substantially any time; wherein the plurality of feedback devices are configured to forward the preference feedback to the at least one computer; wherein the at least one computer performs one or more of the following:
  collects and/or stores a first set of data comprising one or more of the following: the preference feedback from the plurality of feedback devices; a statistics regarding time corresponding to when individual preference feedback was collected; a statistics regarding time period corresponding to when the individual preference feedback was collected; a statistics regarding time corresponding to when a plurality of preference feedbacks was collected; a statistics regarding time period corresponding to when the plurality of preference feedbacks was collected; and how many times an individual feedback device of the plurality of feedback devices collected the preference feedback;
  collects and/or stores a second set of data comprising at least one measured value;

provides instructions that may result in a change in the at least one second parameter;

constructs at least one group preference model based at least in part on at least part of the first set of data and at least part of the second set of data, wherein the at least one group preference model predicts the future first set of data given the future second set of data;

provides instructions in periodic time intervals, in real time, in substantial real time or combinations thereof, based on the at least one group preference model and on at least one measured physical parameter, wherein the instructions are directed to one or more of the following: maintain the future first set of data within a certain range; precipitate the future first set of data to a predefined range; move the future first set of data towards a certain range; maintain the future first set of data within a certain range while satisfying a constraint; precipitate the future first set of data to a predefined range while satisfying the constraint; and move the future first set of data towards a certain range while satisfying a constraint; and corrects at least one group preference model based at least in part on at least part of the first set of data and at least part of the second set of data.

Certain embodiments may provide for a system comprising: at least one computer; and a plurality of feedback devices configured to collect preference feedback input in periodic time intervals and/or substantially real time and at a low transaction cost by permitting individual feedback to be actuated in a single action; wherein the plurality of feedback devices are configured to forward the preference feedback to the at least one computer; wherein the one single action may be actuated by an individual in periodic time intervals, predefined time intervals, random time intervals, substantially random time intervals or at substantially any time; wherein the at least one computer comprises: at least one memory for storing a first set of data comprising at least: (i) the preference feedback from the plurality of feedback devices; (ii) a time corresponding to when the preference feedback was collected; and (iii) how many times a particular one of the plurality of feedback devices collected the preference feedback; at least one processor for: (i) aggregating the preference feedback from the plurality of feedback devices; and (ii) constructing at least one group preference model based at least in part on at least part of the first set of data and one or more other measured physical parameters, wherein the at least one group preference model is based at least in part on a set of variables that are not directly observable; and (iii) providing instructions based on the at least one group preference model, wherein the instructions provide input to maintain modeled group preferences within a certain range or to move the modeled group preferences towards a certain range while optimizing a predetermined resource.

Certain embodiments may provide for a system comprising: at least one computer, computing device, plurality of computing devices or processor; and a plurality of feedback devices configured to collect preference feedback input in substantially real time and at a substantially low transaction cost by permitting individual feedback to be actuated in a single action; wherein the plurality of feedback devices are configured to forward the preference feedback to the at least one computer; wherein the one single action may be actuated by an individual at periodic time intervals, predefined time intervals, random time intervals, substantially random time intervals or at substantially any time; wherein the at least one computer performs one or more of the following:

collects and/or stores a first set of data comprising one or more of the following: the preference feedback from the plurality of feedback devices; a statistics regarding time corresponding to when individual preference feedback was collected; a statistics regarding time period corresponding to when the individual preference feedback was collected; a statistics regarding time corresponding to when a plurality of preference feedbacks was collected; a statistics regarding time period corresponding to when the plurality of preference feedbacks was collected; and how many times an individual feedback device of the plurality of feedback devices collected the preference feedback; and constructs at least one group preference model based at least in part on at least part of the first set of data and one or more other measured physical parameters, wherein the at least one group preference model is based at least in part on a set of variables that are not directly observable;

provides instructions based on the at least one group preference model, wherein the instructions provide input to maintain modeled group preferences within a certain range or to move the modeled group preferences towards a certain range while optimizing a predetermined resource; and corrects at least one group preference model based at least in part on at least part of the first set of data and one or more other measured physical parameters, wherein the at least one group preference model is based at least in part on a set of variables that are not directly observable.

Certain embodiments may provide for a system comprising: at least one computer, computing device, plurality of computing devices or processor, wherein at least one computer, computing device, plurality of computing devices or processor in aggregate perform more than 100,000, 500,000, 1,000,000 or 5,000,000 machine instructions per second; and a plurality of feedback devices configured to collect preference feedback input in substantially real time and at a substantially low transaction cost by permitting individual feedback to be actuated in a single action; wherein the plurality of feedback devices are configured to forward the preference feedback to the at least one computer; wherein the one single action may be actuated by an individual at periodic time intervals, predefined time intervals, random time intervals, substantially random time intervals or substantially any time; wherein the at least one computer performs one or more of the following:

collects and/or stores a first set of data comprising one or more of the following: the preference feedback from the plurality of feedback devices; a statistics regarding time corresponding to when individual preference feedback was collected; a statistics regarding time period corresponding to when the individual preference feedback was collected; a statistics regarding time corresponding to when a plurality of preference feedbacks was collected; a statistics regarding time period corresponding to when the plurality of preference feedbacks was collected; and how many times an individual feedback device of the plurality of feedback devices collected the preference feedback; and constructs at least one group preference model based at least in part on at least part of the first set of data and one or more other measured physical parameters, wherein the at least one group preference model is based at least in part on a set of variables that are not directly observable;

provides instructions based on the at least one group preference model, wherein the instructions provide input to maintain modeled group preferences within a certain range or to move the modeled group preferences towards a certain range while optimizing a predetermined resource; and corrects at least one group preference model based at least in part on at least part of the first set of data and one or more other measured physical parameters, wherein the at least one group preference model is based at least in part on a set of variables that are not directly observable.

Certain embodiments may provide for a system comprising: at least one computer, computing device, plurality of computing devices or processor; a plurality of devices configured to execute instructions, wherein the instructions are provided by at least one computer, computing device, plurality of computing devices or processor; and a plurality of feedback devices configured to collect preference feedback input in substantially real time and at a substantially low transaction cost by permitting individual feedback to be actuated in a single action; wherein the plurality of feedback devices are configured to forward the preference feedback to the at least one computer; wherein the one single action may be actuated by an individual at periodic time intervals, predefined time intervals, random time intervals, substantially random time intervals or substantially any time; wherein the at least one computer performs one or more of the following:

collects and/or stores a first set of data comprising one or more of the following: the preference feedback from the plurality of feedback devices; a statistics regarding time corresponding to when individual preference feedback was collected; a statistics regarding time period corresponding to when the individual preference feedback was collected; a statistics regarding time corresponding to when a plurality of preference feedbacks was collected; a statistics regarding time period corresponding to when the plurality of preference feedbacks was collected; and how many times an individual feedback device of the plurality of feedback devices collected the preference feedback; and constructs at least one group preference model based at least in part on at least part of the first set of data and one or more other measured physical parameters, wherein the at least one group preference model is based at least in part on a set of variables that are not directly observable;

provides instructions in periodic time intervals, real time, in substantial real time or combinations thereof based on the at least one group preference model and on at least one measured physical parameter, wherein the instructions are directed to maintain modeled group preferences within a certain range or to move the modeled group preferences towards a certain range while keeping predetermined resource within predefined range; and corrects at least one group preference model based at least in part on at least part of the first set of data and one or more other measured physical parameters, wherein the at least one group preference model is based at least in part on a set of variables that are not directly observable.

Certain embodiments may provide for a system comprising: at least one computer, computing device, plurality of computing devices or processor; and a plurality of feedback devices configured to collect preference feedback input in substantially real time and at a substantially low transaction cost, wherein the substantially low transaction cost is achieved by one or more of the following: permitting individual feedback to be actuated in a single action; permitting the single action to be actuated by an individual at periodic time intervals, predefined time intervals, random time intervals, substantially random time intervals or substantially any time; wherein the plurality of feedback devices are configured to forward the preference feedback to the at least one computer; wherein the at least one computer performs one or more of the following:

collects and/or stores a first set of data comprising one or more of the following: the preference feedback from the plurality of feedback devices; a statistics regarding time corresponding to when individual preference feedback was collected; a statistics regarding time period corresponding to when the individual preference feedback was collected; a statistics regarding time corresponding to when a plurality of preference feedbacks was collected; a statistics regarding time period corresponding to when the plurality of preference feedbacks was collected; and how many times an individual feedback device of the plurality of feedback devices collected the preference feedback; and constructs at least one group preference model based at least in part on at least part of the first set of data and one or more other measured physical parameters, wherein the at least one group preference model is based at least in part on a set of individual preference models, wherein individual preference models are based on one or more of the following: variables that are not directly observable; individual preference with regard to at least one measurable physical parameter; and one or more of the following probabilities: providing a positive feedback; providing negative feedback; and providing neutral feedback; wherein one or more probability is a conditional probability.

provides instructions based on the at least one group preference model, wherein the instructions provide input to maintain modeled group preferences within a certain range or to move the modeled group preferences towards a certain range while optimizing a predetermined resource; and corrects the at least one group preference model based at least in part on at least part of the first set of data and one or more other measured physical parameters.

Certain embodiments may provide for a system comprising: a plurality of feedback devices configured to collect preference feedback input within a second system in substantially real time at a low transaction cost by permitting individual feedback to be actuated by performing one single action and the plurality of feedback devices are configured to forward the collected preference feedback to an at least one processor; the at least one processor aggregates the preference feedback from the plurality of feedback devices and constructs at least one group preference model based at least in part on the aggregated feedback and one or more other measured physical parameters, wherein the at least one group preference model is based at least in part on a set of fuzzy variables that are not directly observable; and the at least one processor provides instructions based on the constructed at least one group preference model and those instructions provide input to the second system to maintain group preferences within the second system within a certain range or to move the group preferences within the second system towards a certain range.

Certain embodiments may provide for a method for providing instructions regarding system settings comprised of: deploying a plurality of feedback devices configured to collect preference feedback input within the system in substantially real time and at a low transaction cost by permitting individual feedback to be actuated in one single action, wherein the one single action may be actuated by an individual at periodic time intervals, predefined time intervals, random time intervals, substantially random time intervals or substantially any time; forwarding the collected preference feedback from the plurality of feedback devices to at least one processor; aggregating the preference feedback from the plurality of feedback devices and constructing at least one group preference model based at least in part on the aggregated feedback and one or more other measured physical parameters with assistance of the at least one processor, wherein the at least one group preference model is based at least in part on a set of fuzzy variables that are not directly observable; and providing instructions based on the constructed at least one group preference model and those instructions provide input to maintain modeled group preferences within a certain range or to move the modeled group preferences towards a certain range.

Certain embodiments may provide for a method for providing instructions regarding system settings comprised of: deploying a plurality of feedback devices configured to collect preference feedback input within a system in substantially real time at a low transaction cost by permitting individual feedback to be actuated by performing one single action, and the one single action may be actuated at periodic time intervals, predefined time intervals, random time intervals, substantially random time intervals or substantially any time and the plurality of feedback devices are configured to forward the collected preference feedback to an at least one processor; aggregating the preference feedback from the plurality of feedback devices and constructing at least one group preference model based at least in part on the aggregated feedback and one or more other measured physical parameters with assistance of the at least one processor, wherein the at least one group preference model is based at least in part on a set of fuzzy variables that are not directly observable; and providing instructions based on the constructed at least one group preference model and those instructions provide input to the system to achieve one or more of the following: maintain group preferences within the system within a certain range, to move the group preferences within the system towards a certain range, and to generate more feedback.

Certain embodiments may provide for a preference indication device for use in a system for setting and/or adjusting at least one condition, the preference indication device being configured to be used in a network containing a plurality of additional preference indication devices and at least one computer, the preference indication device comprising: an interface configured to permit an individual to input preference information corresponding to the at least one condition; a transmitter for transmitting the preference information to at least one computer; a receiver for receiving information representative of an aggregate preference of a plurality of individuals from the at least one computer, the aggregate preference being based at least in part on preference information transmitted to the at least one computer by the preference indication device and the plurality of additional preference indication devices; a display for displaying a visual indication of the aggregate preference of the plurality of individuals to encourage further input of preference information to the preference indication device.

Certain embodiments may provide for a preference indication device for use in a system for setting and/or adjusting at least one condition, the preference indication device being configured to be used in a network containing a plurality of additional preference indication devices and at least one computer, the preference indication device comprising: an interface configured to permit an individual to input preference information corresponding to the at least one condition; a transmitter for transmitting the preference information to at least one computer; a receiver for receiving information representative of an aggregate preference of a plurality of individuals from the at least one computer, the aggregate preference being based at least in part on preference information transmitted to the at least one computer by the preference indication device and the plurality of additional preference indication devices; at least one LED for displaying a visual indication of the aggregate preference of the plurality of individuals to encourage further input of preference information to the preference indication device.

In certain embodiments, the receiver is further configured to receive preference information from at least one of the plurality of additional preference indication devices and the transmitter is configured to transmit the received preference information from the at least one of the plurality of additional preference indication devices to another one of the plurality of additional preference indication devices and/or the at least one computer.

In certain embodiments, the at least one condition is an environmental condition.

In certain embodiments, the environmental condition is a temperature.

In certain embodiments, the preference indication device or feedback device may provide an indication of direction of future movement of the at least one second parameter.

In certain embodiments, the preference indication device or feedback device may provide an indication of direction of future movement of the at least one first parameter.

In certain embodiments, the preference indication device or interface comprises at least one button for indicating a negative feedback and at least one button for indicating a positive feedback.

In certain embodiments, the at least one button may indicate a desire to increase the at least one first parameter.

In certain embodiments, the at least one button may indicate a desire to decrease the at least one first parameter.

In certain embodiments, the at least one button may indicate a desire to keep the at least one first parameter substantially constant.

In certain embodiments, the at least one button may indicate that the at least one first parameter is acceptable.

In certain embodiments, the at least one button may indicate that the at least one first parameter is unacceptable.

In certain embodiments, the at least one button may indicate that the at least one first parameter is tolerable.

In certain embodiments, the at least one button may indicate that the at least one first parameter is intolerable.

In certain embodiments, the group preference model may be defined by one or more of the following: at least one tolerable region, at least one intolerable region, at least one acceptable region and at least one preferred region.

In certain embodiments, the group preference model may be constructed by aggregating individual preference models.

In certain embodiments, the aggregation may be fuzzy AND function.

In certain embodiments, the at least one second parameter is adjusted, based at least in part on the aggregate preference of the plurality of individuals, to an acceptable level for a majority of the plurality of individuals.

In certain embodiments, the at least one second parameter is adjusted, based at least in part on the aggregate preference of the plurality of individuals, to an acceptable and/or tolerable level for at least 60%, 65%, 70%, 75%, 80%, 85%, 90% or 95% of the plurality of individuals.

In certain embodiments, the at least one computer generates and stores distribution information related to the acceptability of the at least one second parameter, based at least in part on the aggregate preference of the plurality of individuals.

In certain embodiments, the at least one computer generates and stores information related to the probability of obtaining one or more of the following: negative feedback, positive feedback and neutral feedback; based at least in part on the aggregate preference of the plurality of individuals.

Certain embodiments may provide for a method for setting and/or adjusting the at least one second parameter, the method comprising: obtaining preference information corresponding to the at least one second parameter from a plurality of individuals using a corresponding plurality of preference feedback devices; transmitting the preference information from the plurality of preference feedback devices to at least one computer, wherein the at least one computer is configured to aggregate the preference information to determine an aggregate preference of the plurality of individuals; receiving information representative of the aggregate preference by the plurality of preference indication devices; displaying a visual indication of the aggregate preference of the group on at least a portion of the plurality of preference indication devices to encourage at least part of the plurality of individuals to provide preference information.

In certain embodiments, the at least one second parameter is an environmental parameter.

In certain embodiments, the environmental parameter is a temperature.

In certain embodiments, the preference information is one of a negative feedback, a positive feedback or a neutral feedback.

In certain embodiments, the negative feedback is one of increase of the at least one second parameter or decrease of the at least one second parameter.

In certain embodiments, the negative feedback is one of increase of the at least one first parameter or decrease of the at least one first parameter.

In certain embodiments, the positive feedback is that the at least one first parameter is acceptable.

In certain embodiments, the positive feedback is that the at least one second parameter is acceptable.

In certain embodiments, the at least one second parameter is adjusted, based at least in part on the aggregate preference of the plurality of individuals, to an acceptable level for a majority of the plurality of individuals.

In certain embodiments, the at least one second parameter is adjusted, based at least in part on the aggregate preference of the plurality of individuals, to an acceptable level for at least 60%, 65%, 70%, 75%, 80%, 85%, 90% or 95% of the plurality of individuals.

In certain embodiments, the at least one computer generates and stores statistical information related to the acceptability of the at least one first parameter, based at least in part on the aggregate preference of the plurality of individuals.

In certain embodiments, the at least one computer generates and stores information related to the probability of obtaining one or more of the following: negative feedback, positive feedback, no feedback and neutral feedback, based at least in part on the aggregate preference of the plurality of individuals.

In certain embodiments, the method may further provide for transmitting at least one instruction to a controller responsible for controlling the at least one second parameter to adjust the at least one second parameter.

In certain embodiments, the at least one second parameter is adjusted in real-time.

In certain embodiments, the at least one second parameter is adjusted in substantially real time.

In certain embodiments, the at least one second parameter is adjusted in periodic time intervals, predefined time intervals, random time intervals, or as needed.

In certain embodiments, the controller does not adjust the at least one second parameter unless the at least one computer determines that a predetermined percentage of the plurality of individuals do not find the at least one first parameter is at an acceptable level.

In certain embodiments, the controller may adjust the at least one second parameter if the at least one computer determines that a probability of receiving at least one negative feedback in a substantially predetermined interval exceeds a predetermined threshold.

In certain embodiments, the controller may adjust the at least one second parameter if the at least one computer determines that a probability of receiving at least one positive feedback in a substantially predetermined interval is below a predetermined threshold.

In certain embodiments, the controller may adjust the at least one second parameter if the at least one computer determines that a probability of not receiving at least one feedback in a substantially predetermined interval is below a predetermined threshold.

In certain embodiments, the controller may adjust the at least one second parameter if the at least one computer determines that a probability of receiving at least one neutral feedback in a substantially predetermined interval is below a predetermined threshold.

In certain embodiments, the at least one second parameter may be adjusted, based at least in part on the aggregate preference of at least a part of the plurality of individuals and at least in part on additional data received by the at least one computer.

In certain embodiments, the at least one second parameter is the temperature in a building and the additional data comprises one or more of the following: sunrise time, sunset time, current outdoor temperature, cost of energy and combinations thereof.

In certain embodiments, the at least one computer sends instructions to a controller to maintain or adjust the temperature within the building based at least in part on the aggregate preference at least a part of the plurality of individuals and the additional data.

In certain embodiments, the instruction may be a request to adjust the temperature in one or more of the following: the building, at least a portion of the building, a room within the building, an area within the building, and a specific level of the building.

Certain embodiments may provide for a system for setting and/or adjusting a temperature profile within a building, the system comprising: at least one computer; a plurality of sensors for measuring temperature and transmitting the measured temperature to the at least one computer; a plurality of preference indication devices that are communicatively coupled to the at least one computer, the preference indication devices comprising: (i) an interface configured to permit an individual to input preference information indicating whether the current temperature is above an acceptable temperature, at an acceptable temperature, or below an acceptable temperature, wherein the transaction cost of imputing preference information may be made substantially low by permitting the individual to input the preference information in a single action; (ii) a transmitter for transmitting the preference information to the at least one computer; (iii) a receiver for receiving an instruction to display a third set of data from the at least one computer; and (iv) a display and/or set of LEDs for displaying the third set of data to encourage further input of preference information; wherein the at least one computer may be capable of: (a) receiving the preference information from the plurality of preference indication devices and the temperature information from the plurality of sensors; (b) aggregating the preference information from the plurality of preference indication devices and generating, based at least in part on the preference information from the plurality of preference indication devices, the aggregate preference information in substantially real time; and (c) transmitting the third set of data to the plurality of preference indication devices and transmitting an instruction to at least one controller for adjusting the temperature profile within the building.

In certain embodiments, the third set of data may be a direction of movement of the at least one second parameter and/or the at least one first parameter.

In certain embodiments, the receiver in the plurality of preference indication devices is further configured to receive preference information from at least one other of the plurality of preference indication devices and/or the at least one computer and the transmitter in the plurality of preference indication devices is configured to transmit the received preference information from the at least one other of the plurality of preference indication devices to another one of the plurality of preference indication devices and/or the at least one computer.

In certain embodiments, the at least central computer is configured to generate at least one tolerable region, at least one intolerable region, at least one acceptable region and at least one preferred region of the temperature profile based at least in part on the aggregate preference of a plurality of individuals.

In certain embodiments, the target temperature may be adjusted, based at least in part on the aggregate preference of at least part of the plurality of individuals, to an acceptable level for a majority of the plurality of individuals.

In certain embodiments, the target temperature may be adjusted, based at least in part on the aggregate preference of at least part of the plurality of individuals, to an acceptable level for at least 60%, 65%, 70%, 75%, 80%, 85%, 90% or 95% of the plurality of individuals.

In certain embodiments, the at least one computer may generate and store statistical information related to the acceptability of the target temperature, based at least in part on the aggregate preference of the plurality of individuals.

In certain embodiments, the at least one computer generates and stores information related to the probability of obtaining one or more of the following: negative feedback, positive feedback and neutral feedback, based at least in part on the aggregate preference of the plurality of individuals.

In certain embodiments, the target temperature may be adjusted in real-time.

In certain embodiments, the target temperature may be adjusted in substantially real time.

In certain embodiments, the target temperature may be adjusted in periodic time intervals, predefined time intervals, random time intervals or substantially random time intervals.

In certain embodiments, the controller may adjust the temperature profile if the at least one computer determines that a predetermined percentage of the plurality of individuals do not find the at least first parameter to be at an acceptable level.

In certain embodiments, the target temperature may be adjusted, based at least in part on the aggregate preference of at least a part of the plurality of individuals and at least in part on the additional data received by the at least one computer.

In certain embodiments, the at least one computer sends instructions to the at least one controller to perform an action that may result in maintaining or adjusting the target temperature within the building based at least in part on the aggregate preference of at least a part of the plurality of individuals and the additional data.

In certain embodiments, the instruction may be a request to adjust the temperature in one or more of the following: the building, at least a portion of the building, a room within the building, a specific level of the building and an area within the building.

In certain embodiments, the at least one computer is a central computer.

Certain embodiments may provide a system comprising a plurality of devices, wherein at least one device of the plurality of devices captures at least one feedback in one substantially simple transaction; and the at least one device of the plurality of devices sends the at least one captured feedback to at least one computer; and the at least one computer receives the least one feedback; and the at least one feedback can be given at one or more of the following: periodic time intervals, predefined time intervals, random time intervals, substantially random time intervals and substantially any time.

Certain embodiments may provide a system comprising a plurality of devices, wherein at least one device of the plurality of devices captures at least one feedback in one substantially simple transaction; and the substantially simple transaction is a button press; and the at least one device of the plurality of devices sends the at least one captured feedback to at least one computer; and the at least one computer receives the least one feedback; and the at least one feedback may be given at one or more of the following: periodic time intervals, predefined time intervals, random time intervals, substantially random time intervals and substantially any time.

Certain embodiments may provide a system comprising a plurality of devices, wherein at least 10, 100, 1000 or 10,000 devices of the plurality of devices individually capture at least one feedback in one substantially simple transaction; and the at least 10, 100, 1000 or 10,000 devices of the plurality of devices individually send the at least one captured feedback to at least one computer; and the at least one computer receives the least one feedback from a substantial portion of the at least 10, 100, 1000 or 10,000 devices of the plurality of devices; and the at least one feedback can be given at one or more of the following: periodic time intervals, predefined time intervals, random time intervals, substantially random time intervals and substantially any time.

Certain embodiments may provide a system comprising a plurality of devices, wherein at least 10, 100, 1000 or 10,000 devices of the plurality of devices individually capture at least one feedback in one substantially simple transaction;

and the substantially simple transaction is button press; and a portion of the at least 10, 100, 1000 or 10,000 devices of the plurality of devices individually send the at least one captured feedback to at least one computer; and the at least one computer receives the least one feedback from a portion of the at least 10, 100, 1000 or 10,000 devices of the plurality of devices; and the at least one feedback can be given at one or more of the following: periodic time intervals, predefined time intervals, random time intervals, substantially random time intervals and substantially any time.

Certain embodiments may provide a system comprising a plurality of devices, wherein a substantial portion of the devices may be part of a wireless network and at least 10, 100, 1000 or 10,000 devices of the plurality of devices individually capture at least one feedback in one substantially simple transaction; and the substantially simple transaction is button press; and a portion of the at least 10, 100, 1000 or 10,000 devices of the plurality of devices individually send the at least one captured feedback to at least one computer; and the at least one computer receives the least one feedback from a portion of the at least 10, 100, 1000 or 10,000 devices of the plurality of devices; and the at least one feedback can be given at one or more of the following: periodic time intervals, predefined time intervals, random time intervals, substantially random time intervals and substantially any time.

Certain embodiments may provide a system comprising a plurality of devices, wherein at least one device of the plurality of devices captures at least one feedback in one substantially simple transaction; and the at least one device of the plurality of devices sends the at least one captured feedback to at least one computer using wireless network; and the at least one computer receives the least one feedback; and the at least one feedback can be given at one or more of the following: periodic time intervals, predefined time intervals, random time intervals, substantially random time intervals and substantially any time.

Certain embodiments may provide a system comprising a plurality of devices, wherein at least one device of the plurality of devices captures at least one feedback in one substantially simple transaction; and the substantially simple transaction is button press; and the at least one device of the plurality of devices sends the at least one captured feedback to at least one computer using wireless network; and the at least one computer receives the least one feedback; and the at least one feedback can be given at one or more of the following: periodic time intervals, predefined time intervals, random time intervals, substantially random time intervals and substantially any time.

Certain embodiments may provide a system comprising a plurality of devices, wherein at least 10, 100, 1000 or 10000 devices of the plurality of devices individually capture at least one feedback in one substantially simple transaction; and the at least 10, 100, 1000 or 10000 devices of the plurality of devices individually send the at least one captured feedback to at least one computer using wireless network; and the at least one computer receives the least one feedback from a substantial portion of the at least 10, 100, 1000 or 10000 devices of the plurality of devices; and the at least one feedback can be given at periodic time intervals, substantially any time or combinations thereof.

Certain embodiments may provide a system comprising a plurality of devices, wherein at least 10, 100, 1000 or 10,000 devices of the plurality of devices individually capture at least one feedback in one substantially simple transaction; and the substantially simple transaction is button press; and a portion of the at least 10, 100, 1000 or 10,000 devices of the plurality of devices individually send the at least one captured feedback to at least one computer using wireless network; and the at least one computer receives the least one feedback from a portion of the at least 10, 100, 1000 or 10,000 devices of the plurality of devices; and the at least one feedback can be given at periodic time intervals, substantially any time or combinations thereof.

Certain embodiments may provide a system comprising a plurality of devices, wherein at least one device of the plurality of devices captures at least one feedback and the feedback is given by performing one single action; and the at least one device of the plurality of devices sends the at least one received feedback to at least one computer; and the at least one computer receives the least one feedback; and the at least one feedback can be given at periodic time intervals, substantially any time or combinations thereof.

Certain embodiments may provide a system comprising a plurality of devices, wherein at least one device of the plurality of devices captures at least one feedback and the feedback is given by performing one single action; and the one simple action is button press; and the at least one device of the plurality of devices sends the at least one captured feedback to at least one computer; and the at least one computer receives the least one feedback; and the at least one feedback can be given at periodic time intervals, substantially any time or combinations thereof.

Certain embodiments may provide a system comprising a plurality of devices, wherein at least 10, 100, 1000 or 10,000 devices of the plurality of devices individually capture at least one feedback and the feedback is given by performing one single action; and the at least 10, 100, 1000 or 10,000 devices of the plurality of devices individually send the at least one captured feedback to at least one computer; and the at least one computer receives the least one feedback from a substantial portion of the at least 10, 100, 1000 or 10,000 devices of the plurality of devices; and the at least one feedback can be given at substantially any time.

Certain embodiments may provide a system comprising a plurality of devices, wherein at least 10, 100, 1000 or 10,000 devices of the plurality of devices individually capture at least one feedback and the feedback is given by performing one single action; and the substantially simple transaction is button press; and a portion of the at least 10, 100, 1000 or 10,000 devices of the plurality of devices individually send the at least one captured feedback to at least one computer; and the at least one computer receives the least one feedback from a portion of the at least 10, 100, 1000 or 10,000 devices of the plurality of devices; and the at least one feedback can be given at substantially any time.

Certain embodiments may provide a system comprising a plurality of devices, wherein at least one device of the plurality of devices captures at least one feedback and the feedback is given by performing one single action; and the at least one device of the plurality of devices sends the at least one captured feedback to at least one computer using wireless network; and the at least one computer receives the least one feedback; and the at least one feedback can be given at substantially any time.

Certain embodiments may provide a system comprising a plurality of devices, wherein at least one device of the plurality of devices captures at least one feedback and the feedback is given by performing one single action; and the substantially simple transaction is button press; and the at least one device of the plurality of devices sends the at least one captured feedback to at least one computer using wireless network; and the at least one computer receives the least one feedback; and the at least one feedback can be given at substantially any time.

Certain embodiments may provide a system comprising a plurality of devices, wherein at least 10, 100, 1000 or 10,000 devices of the plurality of devices individually capture at least one feedback and the feedback is given by performing one single action; and the at least 10, 100, 1000 or 10,000 devices of the plurality of devices individually send the at least one captured feedback to at least one computer using wireless network; and the at least one computer receives the least one feedback from a substantial portion of the at least 10, 100, 1000 or 10,000 devices of the plurality of devices; and the at least one feedback can be given at substantially any time.

Certain embodiments may provide a system comprising a plurality of devices, wherein at least 10, 100, 1000 or 10,000 devices of the plurality of devices individually capture at least one feedback and the feedback is given by performing one single action; and the substantially simple transaction is button press; and a portion of the at least 10, 100, 1000 or 10,000 devices of the plurality of devices individually send the at least one captured feedback to at least one computer using wireless network; and the at least one computer receives the least one feedback from a portion of the at least 10, 100, 1000 or 10,000 devices of the plurality of devices; and the at least one feedback can be given at substantially any time.

Certain embodiments may provide a system, wherein the at least one computer is a central computer.

Certain embodiments may provide a system, wherein the one substantially simple transaction is a gesture.

Certain embodiments may provide a system, wherein the at least one computer uses the at least one received feedback to construct a behavioral pattern of at least a portion of a plurality of individuals providing feedback.

Certain embodiments may provide a system, wherein the at least one computer uses the at least one received feedback to update the behavioral pattern of at least a portion of the plurality of individuals providing feedback.

Certain embodiments may provide a system, wherein the at least one computer uses the at least one received feedback to determine preferences of at least a portion of the plurality of individuals providing feedback.

Certain embodiments may provide a system, wherein the at least one computer uses the at least one received feedback to determine preferences pattern of at least a portion of the plurality of individuals providing feedback.

Certain embodiments may provide a system, wherein the at least one computer accumulates the at least one received feedback and uses an accumulated data to construct a behavioral pattern of at least a portion of a plurality of individuals providing feedback.

Certain embodiments may provide a system, wherein the at least one computer accumulates the at least one received feedback and uses the accumulated data to update the behavioral pattern of at least a portion of the plurality of individuals providing feedback.

Certain embodiments may provide a system, wherein the at least one computer accumulates the at least one received feedback and uses the accumulated data to determine preferences of at least a portion of the plurality of individuals providing feedback.

Certain embodiments may provide a system, wherein the at least one computer accumulates the at least one received feedback and uses the accumulated data to determine preferences pattern of at least a portion of the plurality of individuals providing feedback.

Certain embodiments may provide a system, wherein the individual device of the plurality of devices has three buttons.

Certain embodiments may provide a system, wherein the individual device of the plurality of devices has three buttons; and the buttons indicate substantially positive feedback, substantially negative feedback and substantially neutral feedback.

Certain embodiments may provide a system, wherein the individual device of the plurality of devices has at least one button; and the at least one button indicates one or more of the following: substantially positive feedback, substantially negative feedback and substantially neutral feedback.

Certain embodiments may provide a system, wherein the individual device of the plurality of devices provides a visual indication of the direction of preferences.

Certain embodiments may provide a system, wherein the individual device of the plurality of devices provides an indication after the feedback is given.

Certain embodiments may provide a system, wherein the indication is a sound.

Certain embodiments may provide a system, wherein the indication is a visual.

Certain embodiments may provide a system, wherein the indication is one or more of the following: visual indication and audible indication.

Certain embodiments may provide a system capable of reducing energy consumption of a building, a portion of a building, a structure, a portion of a structure, an infra-structure, a portion of an infra-structure, a plurality of buildings, a plurality of structures, a plurality of infra-structures, a city, a portion of a city, a region, a portion of a region or combinations thereof, wherein the reduction of energy consumption may be achieved at least in part by adjusting power consumption of one or more individual devices inside the building, the portion of a building, the structure, the portion of a structure, the infra-structure, the portion of an infra-structure, the plurality of buildings, the plurality of structures, the plurality of infra-structures, the city, the portion of a city, the region, the portion of a region or combinations thereof; wherein the power consumption of one or more individual devices is adjusted so that the group preference of the occupants is maintained within a preferred region or within a tolerable region; wherein the preferred region and/or tolerable region is derived from a group preference model; wherein the group preference model is derived based at least in part on one or more other measured physical parameters and the data and/or information about the data received from feedback devices; and the information about the data may be one or more of the following: statistical distribution of the data, statistical parameters of data (for example momentums), period between successive feedbacks, frequency of feedbacks, amount of times where no feedback was received, amount of time a predefined number of feedbacks was received, and amount of time a predefined number of (i) identical, (ii) similar or (iii) substantially similar feedbacks was received.

DESCRIPTION OF THE DRAWINGS

Certain embodiments may provide a system, wherein the indication is one or more of the following: visual indication and audible indication.

These and other features, aspects, and advantages of the present disclosure will become better understood with regard to the following description, appended claims, and accompanying figures.

DETAILED DESCRIPTION

Figure 1:
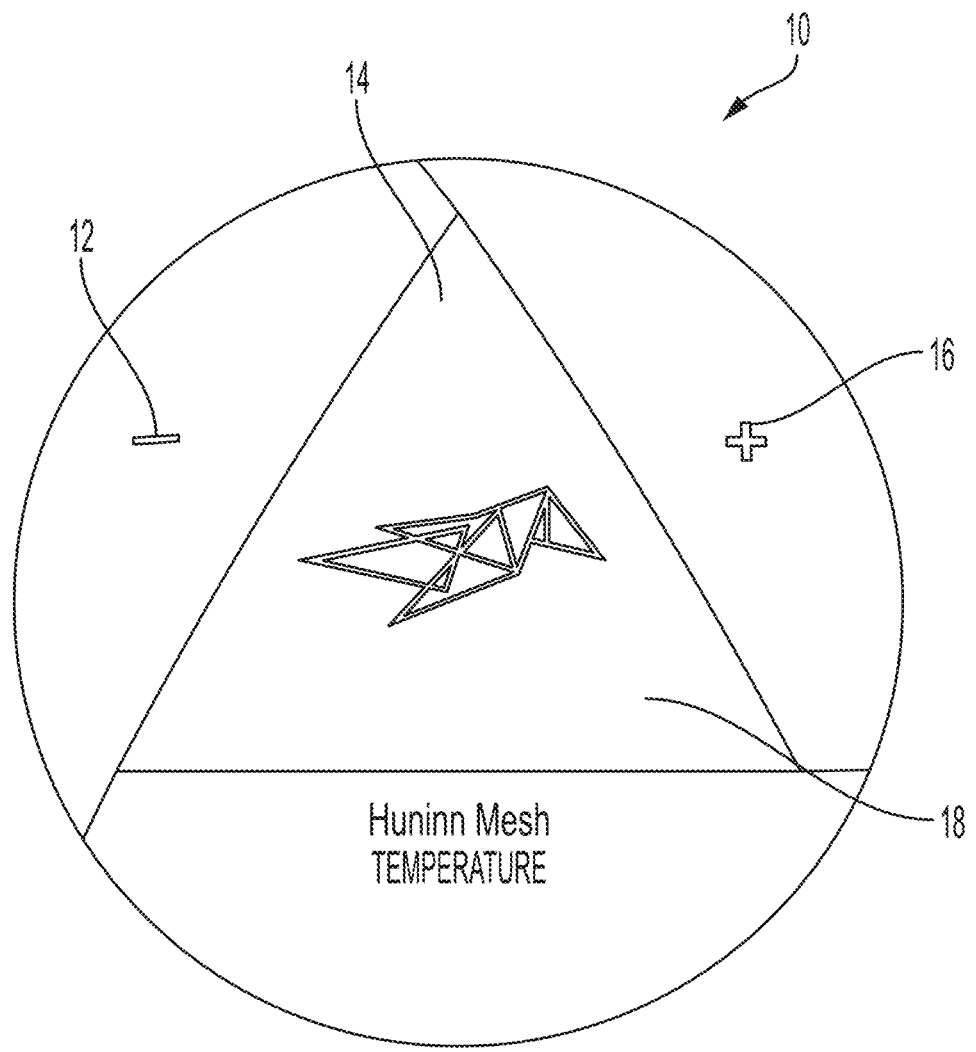
FIG. 1 is an exemplary embodiment of a device for accepting an individual's preference.

The present disclosure is described in further detail with reference to one or more embodiments, some examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide further embodiments. The present disclosure covers these variations and embodiments as well as other variations and/or modifications.

The term "comprise" and its derivatives (e.g., comprises, comprising) as used in this specification is to be taken to be inclusive of features to which it refers, and is not meant to exclude the presence of additional features unless otherwise stated or implied.

The features disclosed in this specification (including accompanying claims, abstract, and drawings) may be replaced by alternative features serving the same, equivalent or similar purpose, unless expressly stated otherwise.

The subject headings used in the detailed description are included for the ease of reference of the reader and should not be used to limit the subject matter found throughout the disclosure or the claims. The subject headings should not be used in construing the scope of the claims or the claim limitations.

Certain applications of the present disclosure are directed to systems, methods and devices for obtaining feedback information from individuals to reveal individual preferences. Certain applications of the present disclosure are directed to using the disclosed systems, methods and devices to assist providers in deriving one or more group preferences that enable providers to implement outcomes (by varying the at least one first parameter) which, in some way conform, at least in part, to the preferences of the group.

In certain applications, individuals may have a personal preference for some parameter (a thing or service). For example, temperature of air, humidity of air, light intensity or color of a lighting source, sound level or quality of an amplified speaker, TV programme mix on a broadcast TV channel, and so forth. As the parameter supplied varies, a substantial portion of individuals may perceive their personal preference value decreasing as the parameter moves away from their preferred value. The actual personal preference value or the perceived personal preference value may not be directly observable, as there are no mechanisms to record these preferences without disturbing the system under observation, through such actions as surveys, questions, forms to be filled in, or other disruptive acts. Therefore, discovery of these preferences may be substantially complex and/or costly to ascertain. For example, individual preferred temperature may vary and may depend on one or more of the following: outside temperature, weather, humidity, expressed preferences of other individuals and perceived preferences of other individuals. In the prior art, individual preferences may be revealed by conducting a survey, receiving a negative feedback as a complaint from an individual when a parameter moves away from the preferred value (for example it becomes too cold or too hot), allowing an individual to directly set the parameter (for example setting temperature set-point of the air-conditioning system) or combinations thereof. In such settings there are significant disruptions to the systems and individuals under observation, and the actions required to collect preferences may be costly to both the individual and the system.

With respect to the parameter or parameters at issue, individual preferences may vary significantly between people and may also depend on historical relationships—both past results and future expectation regarding outcomes. Sometimes, an individual's preference may also be influenced by a group preference. Providers of services and/or products may, in some instances, desire to provide outcomes which, in some way appeal to the preferences of the group. In certain embodiments, this may be achieved by providing an outcome (or outcomes) which maximize (or, for example, substantially maximize, or optimize) the aggregated preferences of the group. In certain embodiments, this may be achieved by providing an outcome (or outcomes) which factor in the aggregated preferences of the group. In certain embodiments, this may be achieved by providing an outcome (or outcomes) which factor in the aggregated preferences of the group at least in part.

Figure 6:
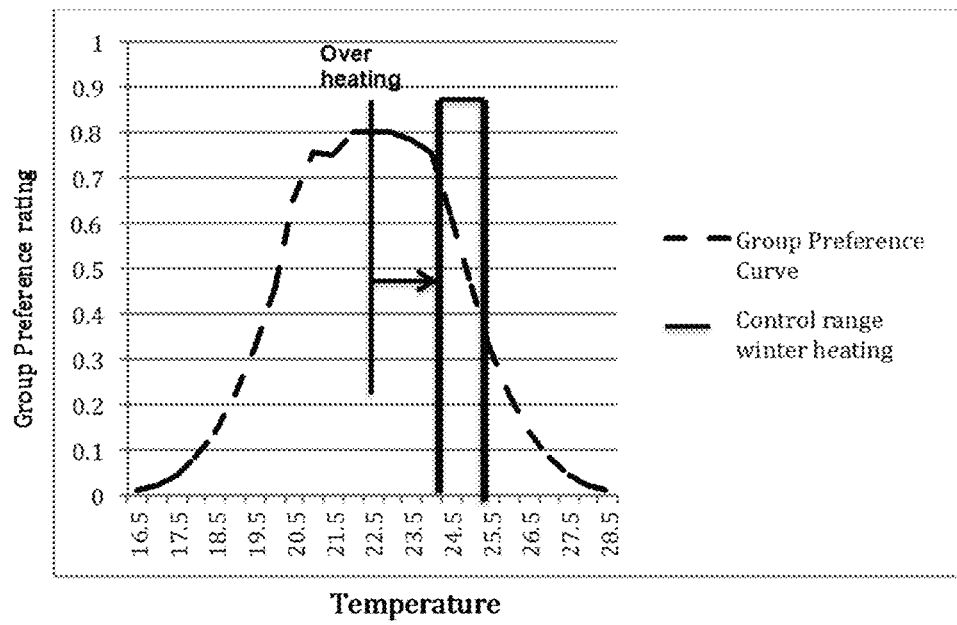
FIG. 6 depicts an unobservable group preference and an inefficient temperature setting resulting in building being overheated, according to certain embodiments.

In certain applications, it may be desirable for a provider of the good and/or service to supply the good and/or service at a parameter setting that substantially maximizes the group value, formed by adding the values of one or more members or each member. In certain applications, it may be desirable for a provider of the good and/or service to supply the good and/or service at a parameter setting that substantially maximizes the group value, formed by multiplying the values of one or more members or each member. In certain applications, it may be desirable for a provider of the good and/or service to supply the good and/or service at a parameter setting that substantially maximizes the group value, formed by factoring in the values of one or more members or each member based at least in part on an aggregation function. These aggregation functions may be quite complex and varied as discussed herein. The provider may want to do this so they don't over or under supply the good and/or service at a certain parameter setting. For example, a building manager wants to not over heat or over cool a building. In another example, the grocery shop manager wants to provide the correct lighting, not too bright and not too dark, to maximize the purchasing decisions of shoppers. In another example, a retail manager wants to provide the correct warmth of lighting, not too warm or too cold, to maximize the purchasing decisions of shoppers. In another example, a concert venue wants to have the best volume settings for the audience, not too loud or too quite, to maximize the enjoyment of the audience at the event. In another example, a restaurant owner may desire to have the background lighting and music set at a level which is positive for most occupants of the restaurant, but which also avoids creating significant discomfort or annoyance to any one particular occupant. However, the problem is that the provider of the good and/or service does not have effective and implementable ways to observe and collect the values to perform the aggregation. Certain aspects of the present disclosure are directed to providing effective and implementable ways to observe and collect the values so that various aggregations may be performed. For example, FIG. 6 depicts an unobservable group preference and an inefficient temperature setting resulting in building being overheated. In this example, the preferred temperature has been aggregated from the preferences of occupants in the room (which may be 10, 20, 50, 100, 1000, 10,000 or more occupants or collected preference data points collected using a plurality of preference indication devices) by simple additive preferences. At least a substantial portion of the occupants (or collected preferences) have a temperature range in their preferences above which and below which they report as feeling comfortable. The mid-point of the average of these zones lies at the apex of the group preference curve. If the manager of the heating system could discover this fact, he/she could then lower the set point by several degrees so that the set point is now in the mean center of the average of the comfortable zones, saving a significant amount of energy (typically 10% to 15% for 1-2 degrees Centigrade) whilst at the same time improving the average reported comfort or satisfaction level of the occupants.

Figure 7:
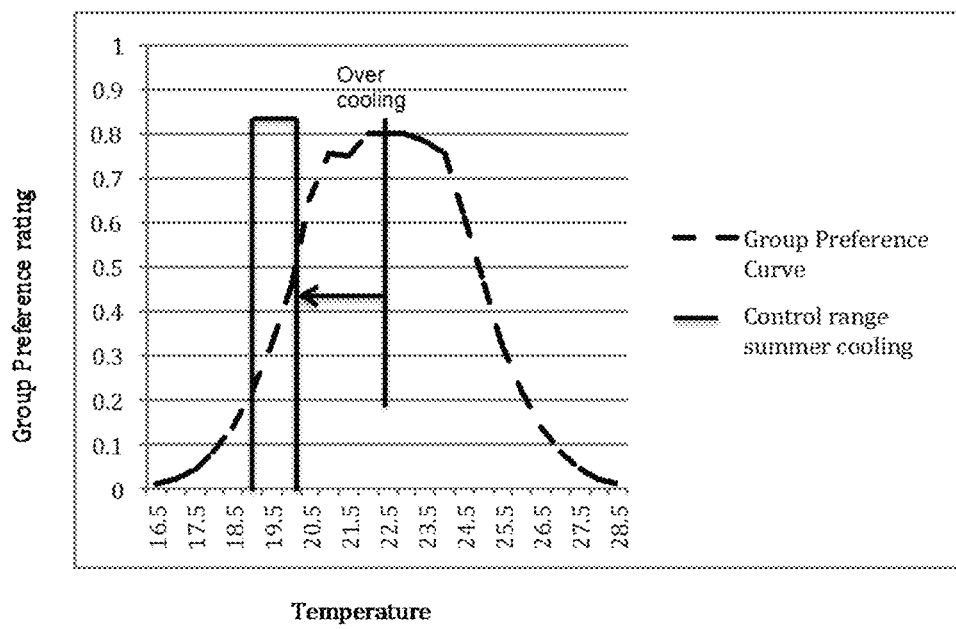
FIG. 7 depicts an unobservable group preference and an inefficient temperature setting resulting in building being overcooled, according to certain embodiments.
Figure 8:
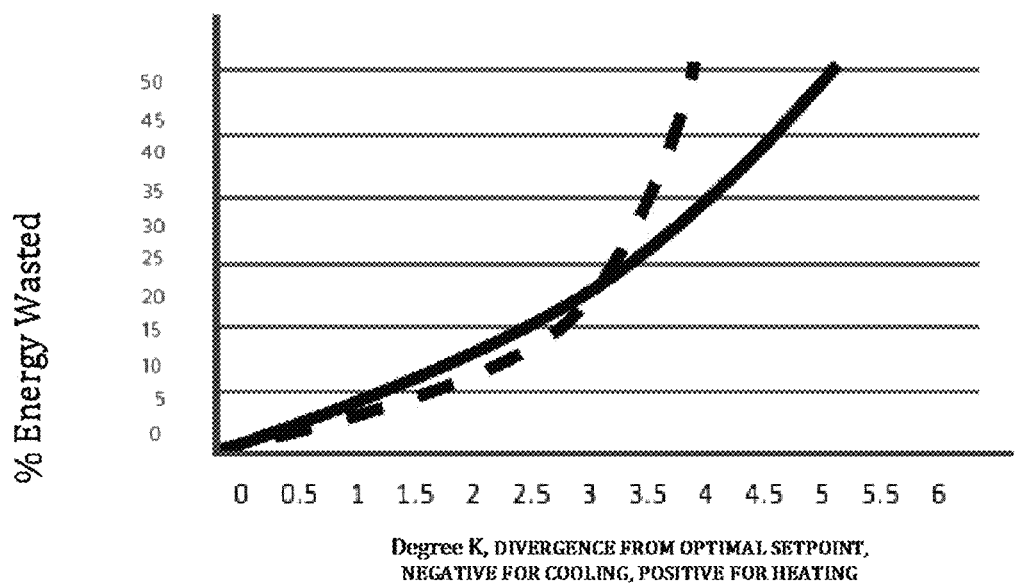
FIG. 8 shows an exemplary cost impact of incorrect temperature setting.

FIG. 7 depicts an exemplary unobservable group preference where the group preference has been formed by adding together the indicated preferences of the occupants in the room (which may be 10, 20, 50, 100, 1000, 10,000 or more occupants or collected preference data points collected using a plurality of preference indication devices) by simple additive preferences. A substantial portion of the occupants (or collected preferences) has a preference zone that indicates the temperature above which and below which they feel comfortable. The mid-point of the average of these zones lies at the apex of the group preference curve. In this example, the current set point of the cooling system is below this mid-point, implying that the cooling system is overcooling the building and for a significant portion of the occupants (or collected preferences) energy is being spent to make them more uncomfortable. If the manager of the cooling system could observe this aggregation, he/she could reduce the amount of cooling and create an environment in which a greater proportion of the individuals where within their comfort zones, and also save a significant amount of energy in the cooling system. FIG. 8 shows an exemplary cost impact of a set-point that has been set to an inefficient temperature setting. This graph shows the percentage energy savings that are possible as a temperature set-point is reduced for heating systems and conversely as a temperature set-point is increased for cooling systems. The optimal setting is assumed to be at the mean of the center points of the aggregated comfort zones for the occupants of the building (or area), and would be at the apex of the aggregated preference curve. As the temperature diverges from this optimal setting, the graph indicates the percentage of energy that is being wasted by the cooling or heating system, through the set-point being set at a too high or a too low number. As the temperature diverges from the optimal point, either over heating in winter or over cooling in summer, more energy is being consumed, and yet more occupants are being shifted out of their comfort zones. The net result is a negative combination of negative aggregate outcomes coupled with increased expenditure to achieve that outcome.

In certain embodiments, the revelation of an individual's preference may involve an action by the individual. In general, the action of divulging this preference has an associated transaction cost, which is the perceived disutility of performing the action by the individual. Such disutility may come in many forms, and in certain cases may include the time taken to perform the task, the energy required to travel the distance and perform the action, the placing of focus by the mind of the individual on this action verses other actions available at the time to that individual, the negative reaction of others perceiving the registration of a response that may be contrary to the prevailing group response, the mental energy involved in selecting one response verses other possible responses, other forms of cost or discomfort and combinations thereof. In certain applications, this transaction cost is an amalgamation of these and other factors, the net result of which is that the individual perceives a barrier to undertaking the task of revealing their preference, and that the size of the barrier is a representation of the transaction costs involved. In certain applications, one particular aspect may prevail over other aspects, and be the dominant barrier. For example, in certain applications the overriding factor may be the amount of time taken to reveal the preference. In other applications the overriding factor may be the mental cost of choosing between alternatives and spending the mental effort to make and express the choice. Whatever the source of the cost, the higher the transaction cost the less likely it is that an individual may reveal their preference, because of the necessity that a higher positive perceived benefit may be expected so as to outweigh the transaction cost. For example, if an individual believes that their preference aligns with others in the group, then an individual may avoid revealing their preference (and so eliminate the transaction cost) and simply rely on the revelations of the others in the group. This is termed the free rider problem of group preference revelation. Similarly, if they believe their preference is in the minority, the low probability of expected success from revelation may discourage them from revealing their preference, as the expected benefit does not outweigh the known cost. When individuals fail to act in this way, providers may fail to get feedback which may result in the provider over providing or under providing for the outcome. This may result in a sub-optimal outcome for a portion or a substantial portion of the parties involved.

In certain applications, it may be desirable for the provider of the good to supply the good and/or service at a parameter setting that substantially maximizes the group value, wherein the group value may be formed by fuzzy logic addition of a substantial part of individual values of members of the group. The provider may want to supply the good at a parameter setting that substantially maximizes the group value so the provider doesn't over or under supply the good at the parameter setting. For example a building manager wants to not over heat or over cool a building. However, the building manager cannot observe the individual temperature preference values and/or curves and therefore may be unable to calculate the group value and/or curve. In certain applications, it may be desirable for the provider of the good to supply the good and/or service at a parameter setting that factors in the group value and the parameter setting falls within a defined parameter range, wherein the group value may be formed by fuzzy logic addition of substantial part of individual values of members of the group.

Certain embodiments are directed to providing one or more mechanisms for determining when the group preference is approaching the maximum value using a plurality of preference feedback devices wherein: (1) at least a substantial portion of the plurality of devices are capable of capturing at least one of the following signals: a decrease, a stay same, an increase; (2) at least a substantial portion of the plurality of devices collects feedback from one or more individuals regarding the current control settings for the parameter (for example, is it decreasing, is it staying the same, is it increasing); and (3) at least a substantial portion of the plurality of devices are simple to actuate. These devices may be located amongst the group of people who form the value group whose preferences are being maximized. In certain applications, the number of devices may be varied, up to one device per person, and the average distance for a person to travel to actuate a signal may be varied by changing the location of one or more of the preference feedback devices (both may vary the transaction cost of actuating the preference device). A member of the group may decide at various points in time whether or not to actuate one of the signals of the preference device. In certain applications, the individual decision to actuate the signal may be made based on whether the probability weighted expected value of the consequence of actuating the signal exceeds the transaction cost (for example, in terms of time and effort) of actuating the signal, wherein the transaction cost may be described by $C=A+B$, wherein C is a transaction cost, A is a deterministic variable and B is a random variable with zero mean value. The probability weighted expected value may be determined by an assessment of the likelihood that actuating the signal may result in a change in the control system. Depending on whether an individual is aware or not aware of the signals of others, one strategy may be to presume that the likelihood may be small, but not zero, the other strategy may be to presume that the likelihood may be substantial. Therefore, it may be desirable to use a preference device that imposes a low transaction cost so that an individual who observes a divergence from its preferred value is more likely to actuate the signal. The size of the divergence may increase the likelihood of actuating the signal. As the supplier or provider changes the parameter settings the probability of receiving a feedback event from a member of the group may be monotonically or substantially monotonically positively correlated to the divergence from the preferred value of that member of the group. In certain applications, by allowing the parameter settings to vary the supplier may discover a region where the probability of receiving at least one signal from the group and the at least one signal from the group not being the "neutral" (stay the same) signal is below a certain threshold. This threshold may be referred to as the tolerable threshold. The tolerable threshold may set a tolerable zone for the parameter beyond which the probability of receiving a non neutral response is less than the tolerable threshold value. This region may be broad and it may be desirable to further determine a preferred region within the tolerable region.

In certain applications, it may be desirable to emphasize the neutral signal. The preference device may provide a steady actuation button that sends the neutral signal, this button may be referred to as a neutral button. The neutral button may be bigger than other buttons. The neutral button may provide a physical, visual and/or audible feedback or a combination thereof. The construction of the neutral button and the physical, visual and/or audible feedback or a combination thereof may be used to encourage the actuation of the neutral button. In certain applications, a person, on observing either the arrival at an optimal preference or on observing that the direction of future control may move away from their current optimal preference, may make a determination that the probability weighed expected value of actuating the neutral button may exceed the transaction cost (in terms of time and effort) of actuating the signal, wherein the transaction cost may be described by $C=A+B$, wherein C is a transaction cost, A is a deterministic variable and B is a random variable with zero mean value. In certain applications, the system may be designed to weight neutral signals more than other signals. The preference device may be designed such that the neutral button may be perceived as being weighted more strongly by the system. The preference device may be designed to give an indication that the neutral button may be weighted more strongly by the system. For example, the neutral button may be located in the central portion of the device and may be larger, and may have other (optional) feedback concepts (such as noises) that indicate it is more important and carries a higher weight than other buttons. For example, one strategy for an individual may be to assume that if the system nears a preferred point or the system indicates that it is moving away from a preferred point, then there is a narrow benefit function associated with pressing the button.

Figure 9A:
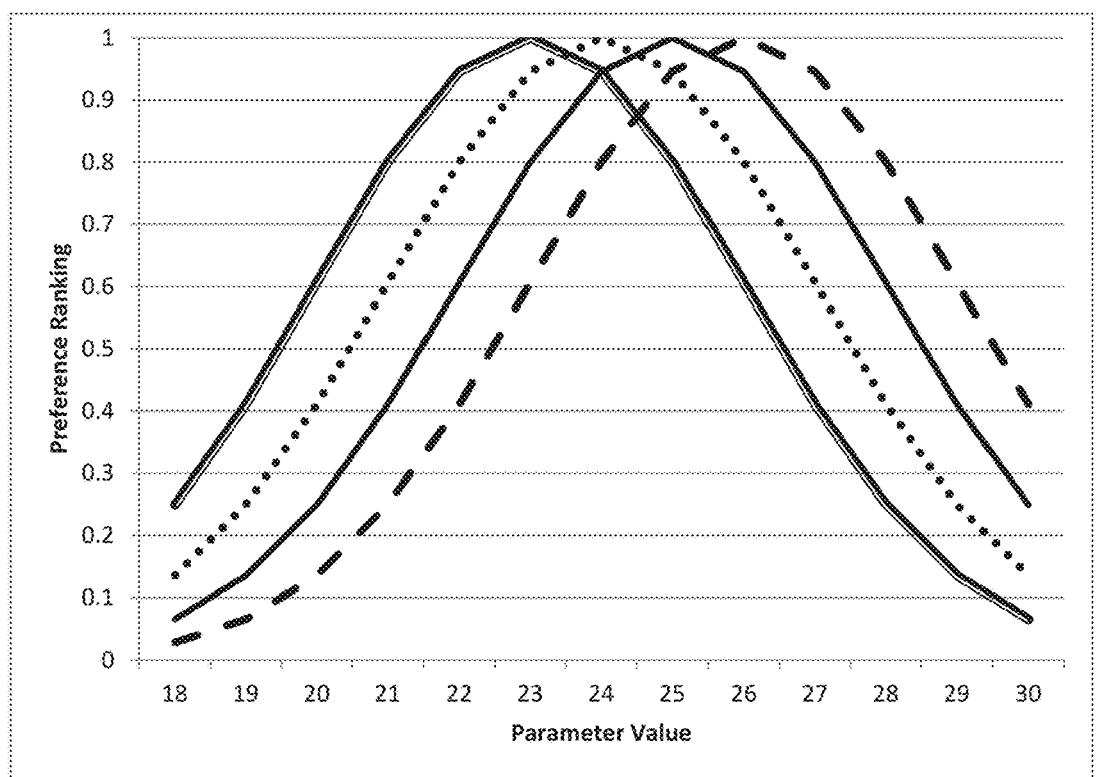
FIG. 9A depicts individual preference functions, according to certain embodiments.
Figure 9B:
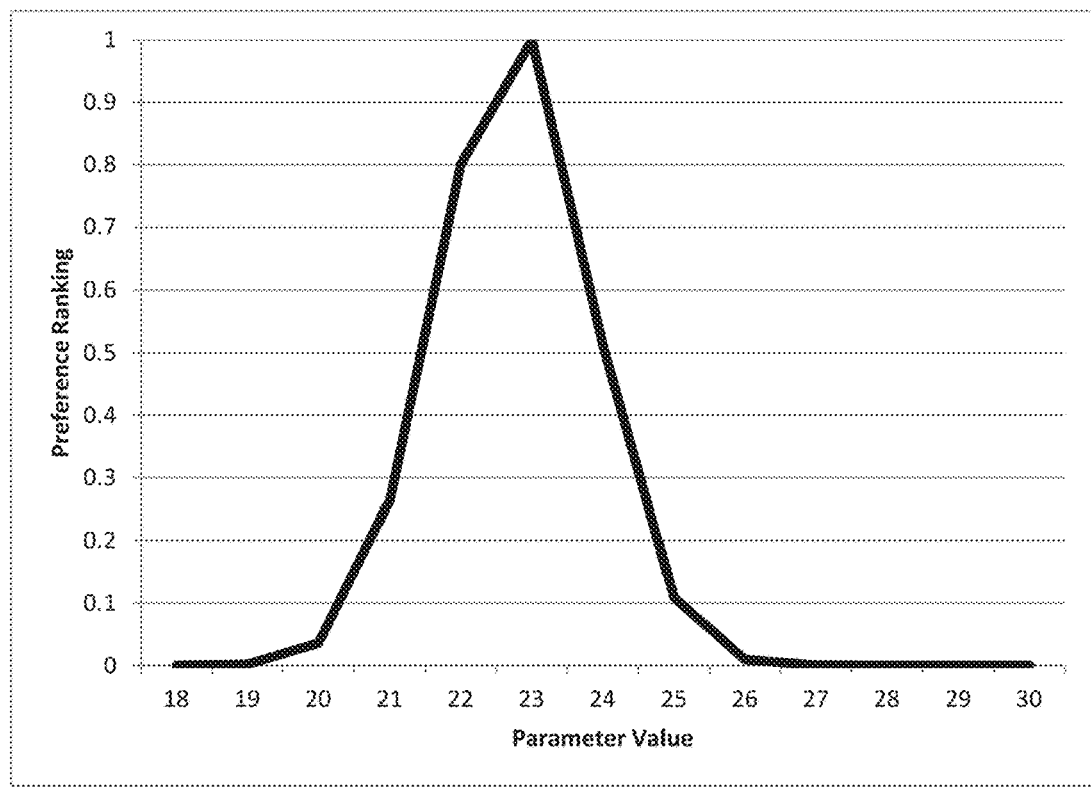
FIG. 9B depicts an aggregated group preference function, according to certain embodiments.

The maximum or a region in a vicinity of the maximum of probability distribution function of receiving a neutral signal may be substantially correlated to the maximum or a region in a vicinity of the maximum of an aggregated group preference function, wherein the aggregation may be done by applying fuzzy AND to individual preference function. FIG. 9A depicts individual preference functions, according to certain embodiments. FIG. 9A is exemplary and depicts four individual preferences for the temperature in the room. The preference ranking is normalized to one; zero being intolerable temperature and one being the most preferred temperature. FIG. 9B depict the individual preference functions in 9A as an aggregated group preference function, according to certain embodiments. In FIG. 9B, the aggregation is performed by performing fuzzy AND (or multiplying) individual values. However, other aggregation function may be used. For example, weighted multiplication where certain individual preference functions are given higher value than others, weighted addition, weighted addition followed by normalization or combinations thereof. In certain applications, allowing the parameter settings to vary the supplier or provider may determine a region where the probability of receiving at least one neutral signal from the group is above a certain threshold. This threshold may be referred to as the acceptable threshold. The acceptable threshold may set an acceptable zone for the parameter beyond which the probability of receiving a neutral response is more than the acceptable threshold value. This region may be narrow and may be within the tolerable region.

In certain applications, it may be desirable to discover the group preference region by obtaining more or substantially more positive feedbacks (receiving neutral signals) than by obtaining negative feedbacks (receiving non-neutral signals). It may be beneficial to avoid moving the parameter setting outside the acceptable region.

In certain embodiments, the good and/or service may be, for example, environmental outcomes (e.g., temperature, humidity, noise, light, etc.), entertainment related outcomes (e.g., preferences of an audience at an event, or via a broadcast); service related outcomes (e.g., the quality of a restaurant's ambience); or congestion related outcomes (e.g., driving on uncongested highways or sufficiency of street lighting).

The problem for providers of such outcomes is that they wish to provide the outcome so that it maximizes in some way the aggregated preferences of the group. For example, a provider may desire to set one or more environmental conditions of a building or a portion of a building so that it meets the comfort preference of a group of individuals in the building or a portion of a building. For example, a provider may desire to set the volume in a concert to the desired level of the audience or a portion of the audience. In certain embodiments, the individual feedback may be encouraged by a system that has a low transaction cost. For example the feedback action may be simple, involve little thought, involve little physical action, and/or consume a small amount of time. In certain embodiments, the system may have a positive feedback—i.e., the feedback action may be designed to provide positive feedback, so there is some small positive effect to undertaking the action. In certain embodiments, the system may have a forward expectation feedback—i.e., the feedback device may reveal the current direction of outcomes (e.g., whether the outcome is remaining steady, increasing, and/or decreasing). In certain embodiments, the forward expectation feedback may also provide feedback regarding the future outcomes in the absence of additional information (e.g., new feedback). In certain embodiments, the system that may decrease uncertainty and increases the probability of an individual revealing their preference.

In certain embodiments, an individual may be motivated to provide feedback based on, for example, the divergence between current outcomes and preferred outcomes. This relationship may be non-linear—i.e., motivation may increase disproportionately to the divergence. In exemplary embodiments, an individual may be motivated to provide feedback based on, for example, the divergence between expected future outcomes and current outcomes. In certain applications, as knowledge of future outcomes increases, and as future outcomes are expected to diverge from current preferences, the motivation may increase to provide feedback. In exemplary embodiments, an individual may be motivated to provide feedback based on, for example, the positive value of providing the feedback—i.e., the valuing the mere taking of an action (e.g., as observed when by individuals pressing elevator buttons or pedestrian crossing controls numerous times even though they are aware it has no influence).

In certain embodiments, the device may be configured to solicit two different types of feedback—a negative feedback (e.g., a desire for an outcome to change because the current outcome diverges from a preference, or sending a non-neutral signal) or a positive feedback (e.g., an indication of satisfaction with the current outcome and/or a desire not to change the current outcome in the future or sending a neutral signal).

FIG. 1 is an exemplary embodiment of a device for accepting an individual's preference. As illustrated, the device 10 may comprise three buttons or button press points 12, 14, and 16. The device 10 may also include a portion 18 for providing a visual display of information. There may be a tactile response and/or a satisfying subtle noise which provides a sensory feedback to the individual. The center button 14 may be a neutral button and/or it may be larger and/or deliberately more attractive than the other buttons to encourage neutral responses. The central button 14 may have a more "positive" noise or sound associated with it.

In certain embodiments, the device may be configured to permit individuals within the group to observe the current outcome and/or observe the current direction of the outcome controls (e.g., decreasing, constant, or increasing). In certain embodiments, these indications may be provided by visual indicators (e.g., a series of lights) on the device itself. For example, LEDs may flash indicating that room temperature may increase. In another example, LEDs may flash indicating that room temperature may decrease. In another example, LEDs may flash indicating that room temperature may stay the same. In another example, LEDs may flash indicating that group preference may be to increase room temperature. In another example, LEDs may flash indicating that group preference may be to decrease room temperature. In another example, LEDs may flash indicating that that group preference may be to keep room temperature the same.

In certain embodiments, underneath the central button 14, a light feedback section may be included. The light feedback section may blink steadily in the middle of the display 18 if the outcome is maintaining position, it may flash to the right if the outcome is increasing, and it may flash to the left if the outcome is decreasing. In certain embodiments, the light feedback section may blink steadily in the middle of the display 18 if the outcome is maintaining position, it may flash to the right if the outcome is decreasing, and it may flash to the left if the outcome is increasing. In certain embodiments the light feedback may not blink if the outcome is maintaining position, it may blink rapidly the outcome is increasing, and it may blink slowly if the outcome is decreasing. In other embodiments the light feedback may not blink if the outcome is maintaining position, it may blink rapidly the outcome is decreasing, and it may blink slowly if the outcome is increasing. Other configurations are also contemplated.

In certain embodiments, it may be desirable to filter out repetitive feedback entries from the same individual and/or multiply entries entered in quick succession. It may be desirable to allow individuals to provide repetitive feedback (for example, multiple button presses in quick succession)

by configuring the button on the device to include delay sequences that provide feedback but reject repetitive entry within predefined time windows. It may be desirable to activate a delay sequence only after 1, 2, 3, 4, 5, 8, 10 15 or 20 activations of the feedback devices in quick succession. In certain applications, the delay sequence may be activated if there are 1, 2, 3, 4, 5, 8, 10 15 or 20 activations of the feedback device within one or more of the following time periods: 1 second, 5 seconds, 10, seconds, 20 seconds, 30 seconds, 1 minute, 2 minutes, 5 minutes, 15 minutes, 30 minutes, 1 hour, 2 hours or 8 hours. In certain applications, the predefined time widows for the feedback devices may be 1 second, 5 seconds, 10, seconds, 20 seconds, 30 seconds, 1 minute, 2 minutes, 5 minutes, 15 minutes, 30 minutes, 1 hour, 2 hours, 8 hours, 24 hours or combinations thereof in the same feedback device and/or in other feedback devices. In certain embodiments, the predefined time widows may be set at different times for different devices. For example, a portion of the feedback devices have a predefined time widow of 5 seconds, a portion of the feedback devices have a predefined time widow of 30 seconds, a portion of the feedback devices have a predefined time widow of 15 minutes and a portion of the feedback devices have a predefined time widow of 1 hour. Other combinations are also contemplated.

In certain embodiments, if the parameter (or parameters) being observed and which is being modified by some control system (such as the temperature in a room, the light level in a room or the audio volume in a concert), is deliberately varied the shape of one or more probability curves may be determined and then may be shared with one or more individuals In addition, individuals may perceive there is a divergence from their preference and may, therefore, be motivated to act and provide feedback. As more individuals respond to the changing outcome, the system determines the shape of the probability curves for the individuals. Based, at least in part on probability curves, the system may discover one or more underlying preference curves.

In certain embodiments, the probability of feedback may be motivated by the divergence in an individual's preference value from the current outcome. Accordingly, the aggregated probability curve may already be weighted by the individual's value function. That is, the probability curve may already incorporate the fact that some individual feels more strongly about a divergence than another individual. In certain embodiments, this may be summarized by the probability of them providing feedback. Therefore, in certain embodiments, the aggregated probability curves may allow for the intensity of feelings, and may be close to an aggregate utility preference for the group.

Energy Usage Applications

Certain embodiments are directed to systems, methods and/or devices that may be used to manage energy usage related functions over an area that is being managed, wherein feedback information from individuals is obtain to reveal group preferences and the feedback information is factored into the management of energy usage related functions. By making occupants feel comfortable this may encourage more productivity or encourage shoppers to purchase more and stay longer in the shopping site. However, comfort may be subjective and may differ from person to person and be subject to one or more influences. One way to improve comfort is elicit feedback from the occupants. By making the feedback a low transaction cost action, then the result may be more satisfied occupants and shoppers, and because comfort tends to be correlated with external weather, this may actually save significant energy usage in the process. Certain embodiments are directed to eliciting preference feedback in smaller and smaller zones, which may permit the gradually approach to the ideal of making the building environment personal, and reducing or substantially abolishing the notion that people have to live with a certain level of dissatisfaction.

Certain embodiments are directed to systems, methods and/or devices that provide for determining the preferences of occupants in which feedback devices may be strategically located throughout the building. In certain applications, these feedback devices are tri-state devices in which one portion of the device may be actuated to indicate the person is happy and comfortable with the current settings or environmental conditions of the space, whereas the other two portions of the device may be actuated to provide negative feedback, indicating that the environment is one or more of the following: not satisfactory, too hot, too cold, too humid, too bright, not bright enough, too much noise, too little noise and too dry. The feedback devices may be configured to elicit rapid and simple responses, so what they may measure over time is the probability of an occupant or a plurality of occupants registering a neutral feedback input, a high parameter (for example too hot, too bright, too spicy, too noisy, too loud) or a low parameter (for example too cold, too dark, not spicy, not loud enough) response. In certain applications, the feedback devices may be configured to elicit rapid and/or simple responses, so what they may measure over time is the probability of an occupant, or a plurality of occupants, registering one or more of the following: a neutral responses, one or more satisfied responses, a high or a low response. In certain applications, the feedback option may be provided via mobile phone applications that can register the location (or approximate location) in the building of the user, and then solicit feedback regarding the environmental conditions. Certain embodiments are directed to collecting this feedback and develop patterns of preferences and likes and dislikes, correlated these preference with one or more other variables, such as weather and season, time of day, day of the week and other factors. The collected information may be used to derive occupant comfort curves that may be constantly, or substantially constantly adjusted, based at least in part on the collected preferences of the actual people in the building at the time.

Figure 2:
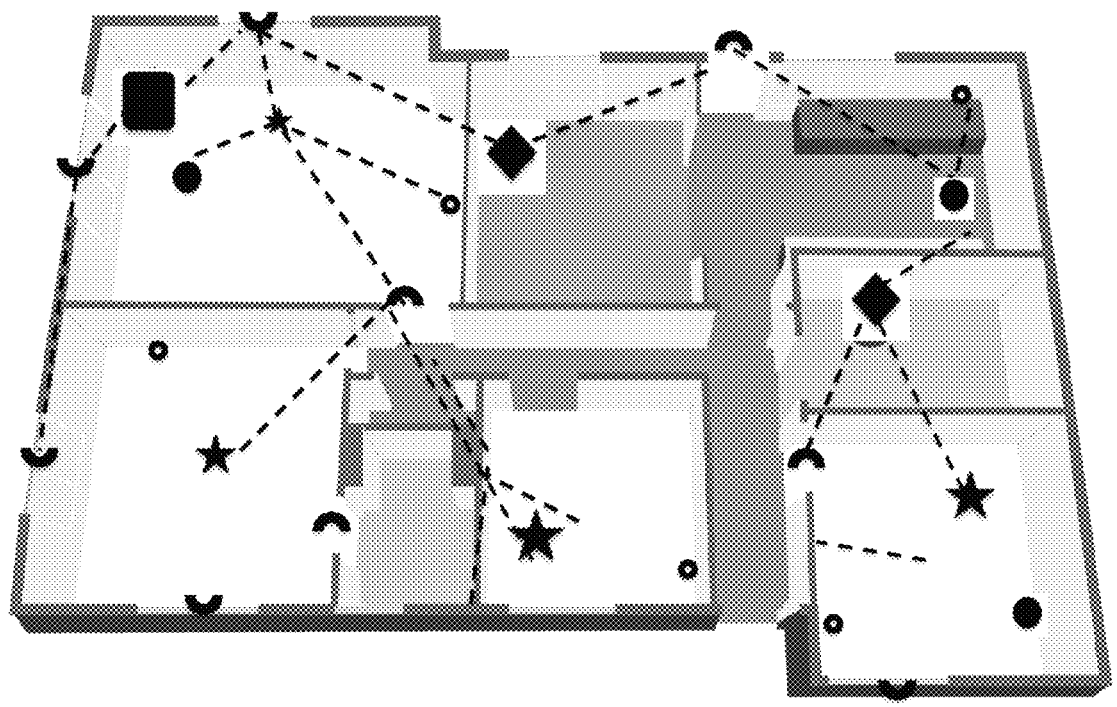
FIG. 2 depicts plurality of sensors, controllers and preference devices, according to certain embodiments.
Figure 3:
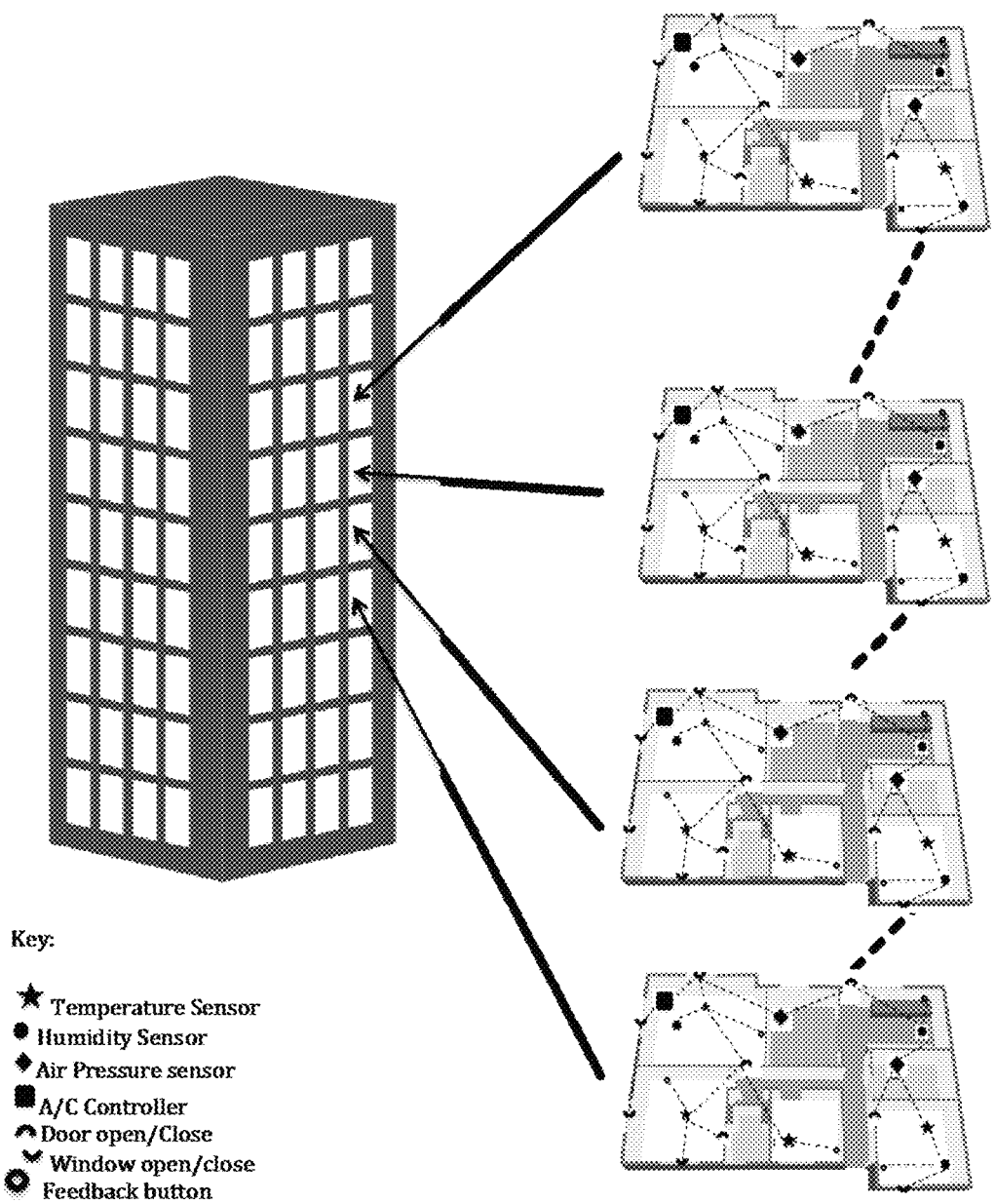
FIG. 3 depicts plurality of sensors, controllers and preference devices deployed in multi-story building, according to certain embodiments.

FIG. 2 depicts plurality of sensors, controllers and preference devices. FIG. 3 depicts plurality of sensors, controllers and preference devices deployed in multistory building. The area being managed may vary in size. The area being managed for energy usage may be a building, a portion of a building, a structure, a portion of a structure, an infra-structure, a portion of an infra-structure, a plurality of buildings, a plurality of structures, a plurality of infra-structures, a city, a portion of a city, a region, a portion of a region or combinations thereof. Certain embodiments are directed to setting up and implementing a network of sensors, controllers and/or preference devices over the area, or portions of the area) in which energy usage is to be managed, wherein the sensors (or a portion of the sensors) monitor one or more physical functions, wherein the controllers (or a portion of the controllers) control at least in part the infra-structure that provides energy to the area and, wherein the preference devices (or a portion of the preference devices) provide aggregated feedback as to the comfort of a portion of the individuals.

In certain applications, by collecting data regarding the one or more physical functions and the preference feedback, the information collected may be used to provide instructions to not alter the energy usage, alter the energy usage in one or more portions of the area, increase energy usage in one or more portions of the area, decrease energy usage in one or more portions of the area or combinations thereof. In certain applications, by collecting data regarding the one or more physical parameters and the preference feedback, the information collected may be used to provide instructions to alter one or more of portions of the heating, ventilation, and/or air conditioning system being used in the area or portions of the area being managed. These instructions may be provided in real time, substantially real time, on an hourly basis, on a daily basis, on a weekly basis, on a periodic time basis, on a non-periodic time basis or combinations thereof. The instructions provided to one or more portions of the area being managed may vary depending on one or more factors, for example, the feedback provided as to comfort, the time of day, the occupancy level, weather conditions, energy prices, forecasted occupancy levels, forecasted weather conditions, forecasted energy prices. In certain applications, the data collected may be used to generate energy usage patterns and/or curves that allow for adjustments to the energy used in the area being monitored and in aggregate may result in substantial savings in energy cost or energy consumption, substantially the same level of comfort for a portion or a substantial portion of the occupants and/or improved levels of comfort for a portion or a substantial portion of the occupants. Certain applications may result in substantial savings in energy costs or energy consumption and substantially maintain and/or increased comfort (or perceived increased comfort) of the occupants of the area being managed. In certain applications, the information collected may be used to generate energy usage patterns and/or curves that allow for adjustments to the energy used in other similar areas and in aggregate result in substantial savings in energy cost or energy consumption and substantially the same level of comfort for a portion or a substantial portion of the occupants and/or improved levels of comfort for a portion or a substantial portion of the occupants. Again the use of energy usage patterns and/or curves may result in substantial aggregated savings in energy costs or energy consumption and maintaining and/or increasing the comfort (or perceived comfort) of the occupants of the area being managed. In certain applications, the data collected may be combined with other information about the area being managed and/or the surrounding environment and used to generate energy usage patterns and/or curves that allow for adjustments to the energy used and in aggregate result in substantial savings in energy cost or energy consumption. Again the use of energy usage patterns and/or curves combined with other information about the area may result in substantial aggregated savings in energy costs or energy consumption and maintaining and/or increasing the comfort (or perceived comfort) of the occupants of the area being managed. Such networks have been too expensive to date due to at least in part the cost of setting up, using and/or maintaining such a network of sensors and/or controllers. Using one or more aspects of the technology disclosed herein, such networks may be implemented and/or implemented in a cost effective manner.

Certain embodiments are directed to methods and/or systems, wherein a plurality of sensor devices, a plurality of controller devices and/or a plurality of preference devices deployed over an area, for example, in a building, in a portion of a building and/or in a plurality of buildings. A substantial portion of the deployed plurality of sensors are configured to determine one or more physical functions and are capable of transmitting data and/or receiving data. A substantial portion of the deployed plurality of preference devices are configured to collect preference feedback input and are capable of transmitting data and/or receiving data. Data collected from the plurality of sensors, plurality of controllers and/or plurality of preference sensors may be transmitted via the network to a computer or processor or plurality of computers and/or processors. The data collected may be processed by a computer or processor and may be used to derive preference data and/or one or more models, wherein the preference data and/or one or more models may be at least in part one or more of the following: individual preference, group preference, tolerable region, acceptable region, intolerable region, unacceptable region and based on derived preference data and/or one or more models perform one or more of the following: increase energy usage in one or portions of a building, decrease energy usage in one or portions of a building, increase energy usage in one or portions of a plurality of buildings, decrease energy usage in one or more portions of a plurality of buildings, optimize energy usage at one building, optimize energy usage at a portion of a building, optimize energy usage in a plurality of buildings, optimize energy usage in a substantial portion of the building sites, provide recommendations or instructions as to how to adjust energy usage in one or more portions of a building, provide recommendations or instructions as to how to adjust energy usage in one or more portions of a plurality of builds, substantially maintain comfort of occupants, increase comfort of occupants, maintain group preference within acceptable range, maintain group preference within tolerable range, maintain group preference out of inacceptable range and maintain group preference out of intolerable range.

The collected data and/or derived preference data and/or one or more models may be processed by a computer or processor and may be used to perform one or more of the following: increase energy usage in one or portions of a building, decrease energy usage in one or portions of a building, increase energy usage in one or portions of a plurality of buildings, decrease energy usage in one or more portions of a plurality of buildings, optimize energy usage at one building, optimize energy usage at a portion of a building, optimize energy usage in a plurality of buildings, optimize energy usage in a substantial portion of the building sites, provide recommendations or instructions as to how to adjust energy usage in one or more portions of a building, provide recommendations or instructions as to how to adjust energy usage in one or more portions of a plurality of builds, substantially maintain comfort of occupants and increase comfort of occupant by providing instructions to alter one or more of portions of the heating, ventilation and/or air conditioning system being used in the area being managed.

In certain applications, the collected data and/or derived preference data and/or one or more models may also be used to minimize peak power and/or current consumption in one or more of the following: a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region and a portion of a region. The minimizing of peak power and/or current consumption may be implemented by providing recommendations or instructions as to how to adjust energy usage for one or more of the following: a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region and a portion of a region. The recommendations or instructions may be used to alter one or more of portions of the heating, ventilation, and/or air conditioning system being used in the area being managed. In certain applications, the systems and/or methods may be used to optimize energy usage, minimize peak power, minimize current consumption or combinations thereof.

In certain embodiments, derived preference data and/or one or more models, efficiency of energy usage and/or the load shape of usage may be used at least in part for optimizing the supply of power to an area or a portion of an area. For example, a building, portions of a building, one or more portions of a plurality of buildings, a plurality of buildings, an area being managed, one or more portions of an area being managed, a structure, a portion of a structure, one or more portions of a plurality of structures, a plurality of structures, a city, a portion of a city, a region, a portion of a region or combinations thereof. One cost effective investment in power supply may be to invest in reducing the energy demand from a facility (so called "negative energy" or negawatts). There are several ways in which energy may be used more efficiently, for example, investment in more efficient capital assets that utilize the supplied power more efficiently (as in the replacement of existing lighting with LED lighting). Another way of adjusting the desired energy usage is based at least in part on the environment. For example, one or more of the following:

- Whether or not people are present in the building (adjusting and/or fine tuning energy usage based at least in part on occupancy);
- What the perceived preferences of the occupants are with respect to, for example, temperature and humidity (such preferences may be dependent on external temperature, the season, the pattern of weather in the prior few days, other factors or combinations thereof) (adjusting and/or fine tuning to occupant preferences);
- Whether the trajectory of equipment usage lies within the efficient bands of operation of the equipment (adjusting and/or fine tuning the trajectory of set points so that equipment maintains operation inside efficient bands); and
- Whether the building thermal mass and the external air environment may be used in conjunction to deliver energy savings by utilizing external conditions to adjust the thermal position of a building, and then using the building's thermal inertia to carry forward that position (tuning to external weather).

Certain embodiments may deliver between 10% and 25%, between 5% and 15%, between 15% and 25%, between 10% and 30% savings in energy demand. Certain embodiments of the present disclosure may deliver at least 5%, 10%, 15%, 20% or 30% savings in energy usage.

Certain embodiments may deliver between 10% and 25%, between 5% and 15%, between 15% and 25%, between 10% and 30% savings in energy demand while substantially maintaining group preference within preferred region. Certain embodiments of the present disclosure may deliver at least 5%, 10%, 15%, 20% or 30% savings in energy usage while substantially maintaining group preference within preferred region.

Certain embodiments may deliver between 10% and 25%, between 5% and 15%, between 15% and 25%, between 10% and 30% savings in energy demand while substantially maintaining group preference within tolerable region. Certain embodiments of the present disclosure may deliver at least 5%, 10%, 15%, 20% or 30% savings in energy usage while substantially maintaining group preference within tolerable region.

Figure 4:
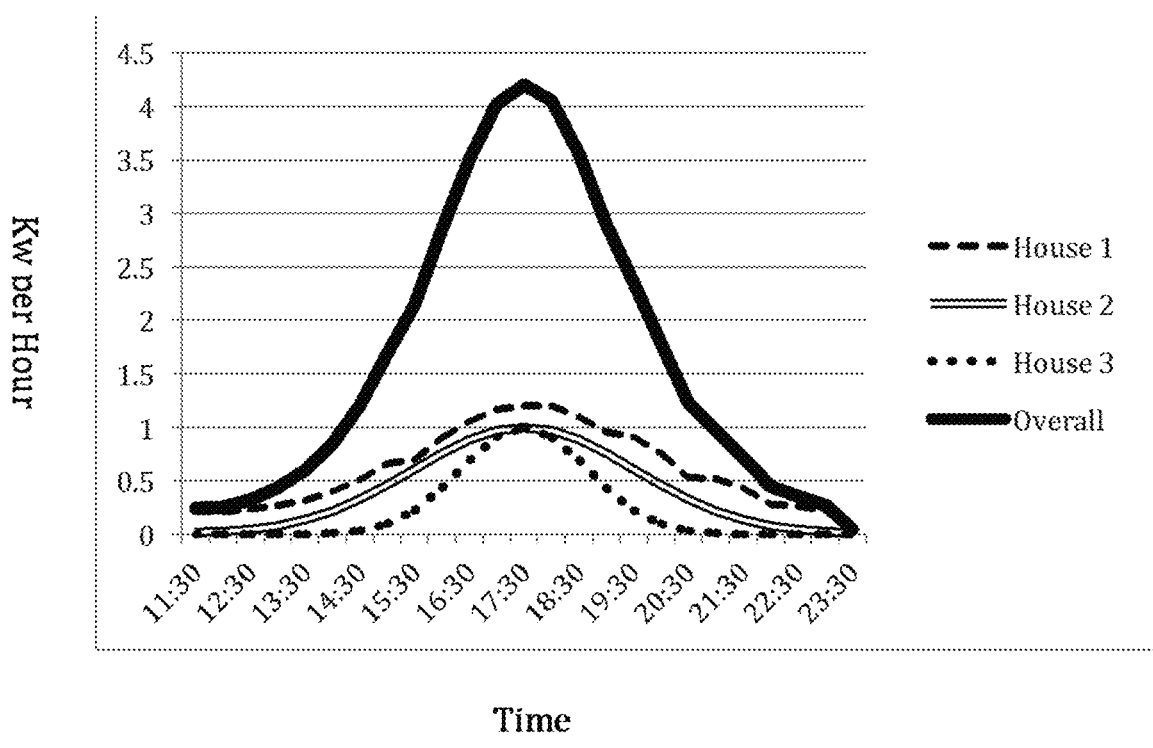
FIG. 4 shows an exemplary typical aggregated load curve.
Figure 5:
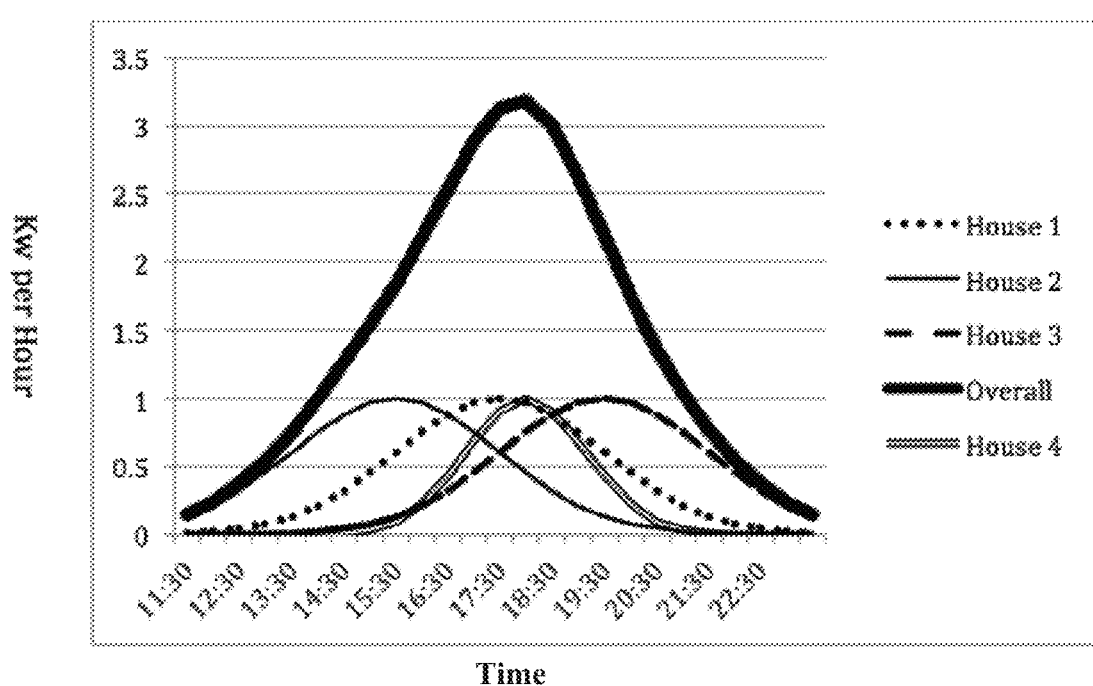
FIG. 5 shows an exemplary flattened aggregated load curve and individual load curves where the peaks are shifted by using one or more of the disclosed embodiments.

Certain embodiments are directed to flattening out the load curve which provides an improvement in capital utilization efficiency. The peak energy demand may be reduced by 10% to 50%, 30% to 70%, 40% to 100%, or 70% to 90%. FIGS. 4 and 5 depict exemplary load curves. FIG. 4 shows an exemplary typical aggregated load curve and FIG. 5 shows an exemplary flatten aggregated load curve and individual load curves where the peaks are shifted while substantially maintaining group preference within preferred region.

Certain embodiments are directed to applications where the loads amongst groups of customers or users are adjusted. Traditionally the loads from customers or users have been regarded as a given, except in certain special cases, and therefore the power grid capital investment program took this load curve as more or less a fixed input. In some cases, customers or users participated in demand management schemes, whereby they reduced load demand under certain events. The disclosed technology allows adjusting the load curves while maintaining group preference within preferable or tolerable region. Certain embodiments are directed to the ability to adjust 10% to 20%, 20% to 50%, 30% to 80% or 50% to 100% of the individual loads amongst groups of customers or users. The ability to adjust individual loads allows the demand curve (an aggregated demand from a group or a portion of customers or users over time) to be treated as a substantially independent variable. Thus, the demand curve may be altered in favor of one or more portions of the system and/or the whole system. In certain applications, the demand curve may be altered in substantially real time or some appropriate time period in order to reduce one or more of the following: average energy demand by 5% to 15%, 10% to 20%, 10% to 50%, 20% to 70% or 30% to 100%; and peak energy demand by 5% to 15%, 10% to 20%, 10% to 50%, 20% to 70%, 30% to 100%. 50% to 150% or 100% to 200%. In certain applications, the demand curve may be altered in substantially real time or some appropriate time period in order to reduce any combination of one or more of the following: average energy demand by any of 5% to 15%, 10% to 20%, 10% to 50%, 20% to 70% and 30% to 100%; and peak energy demand by any of 5% to 15%, 10% to 20%, 10% to 50%, 20% to 70%, 30% to 100%. 50% to 150% or 100% to 200%.

Certain embodiments are directed to applications where a plurality of controlling devices are capable of controlling a plurality of loads and the central computer or processor instructs the plurality of controlling devices to adjust at least one control setting based on at least one price signal, and/or adjust at least one future control setting based on the at least one received price signal. Thus, effectively changing the load curve shape. For example, the central computer or processor may reduce future energy consumption when the energy price reaches a certain prescribed level. Another example is where the central computer or processor may reduce future energy consumption when energy price is rising at certain prescribed slope.

Certain embodiments are directed to applications where a controlling device is capable of controlling a load and the central computer or processor instructs the controlling device to adjust at least one setting based on required adjustment in the supply.

Certain embodiments are directed to making a plurality of shifts in individual energy demands of customers or users and aggregating these shifts to produce a larger aggregating shift in overall energy demand. These shifts may be small shifts, medium shifts, large shifts or combinations thereof. Certain embodiments are directed to making no shift in energy demand, 0.01% to 0.2%, 0.1% to 1%, 0.5% to 5%, 4% to 10%, 5% to 20% or 10% to 30% shift in energy demand for a portion of the individual customers (or users), a substantial portion of the individual customers (or users) or for each individual customer in energy usage and aggregating these shifts to reduce overall energy usage. For example, a 1 KW shift in demand per customer is equivalent to a 1 GW power station when aggregated over 1 million customers.

Certain embodiments are directed to a plurality of sensors and a plurality of controllers configured to communicate with at least one computer or processor, wherein at least a portion of the controllers directly or indirectly control energy usage or energy consumption, and at least one computer or processor substantially optimize and/or adjust energy usage in one or more areas (such as one or more buildings), and aggregates individual energy usage or energy consumptions into an improved controllable load. For example, using one or more disclosed embodiments, the energy load over a group of buildings may be reduced by 5% to 15%, 10% to 20%, 15% to 40%, 20% to 70%, 50% to 100%, 80% to 150% or 100% to 200% by deploying one or more of the following in at least a portion of the group of buildings: sensors for temperature, humidity, occupancy, and current consumption; configuring at least a portion of the equipment used for controlling and/or monitoring the energy needs of the group of buildings; wherein a substantial portion of the sensors and/or controllers are capable of wireless communication.

Determining Occupancy

Certain embodiments are directed to systems, methods and/or devices, wherein sensor data collected and preference data collected is used to partially determine, substantially determine, determine, partially estimate, substantially estimate, estimate, partially predict, substantially predict and/or predict occupancy and comfort of the occupants in a portion of a building, a building, individual rooms in a building, a plurality of buildings, one or more portions in a plurality of buildings, a structure, a portion of a structure, an infra-structure, a portion of an infra-structure or combinations thereof. For example, one cost effective action that a building manager may undertake to reduce energy usage in a building is to turn one or more energy using pieces of equipment off based at least in part of the comfort data collected. This applies at the aggregate level, in terms of the portion of a building, a building, a plurality of buildings, one or more portions in a plurality of buildings, a structure, a portion of a structure, an infra-structure, a portion of an infra-structure or combinations thereof. In general, the more finely a building or managed area (and/or a number of buildings or a number of managed areas) is tuned to comfort, the less energy is consumed. In certain applications, the understanding of comfort patterns means that systems of chillers, air handling units and/or heating systems may be turned on in anticipation of the occupancy rate and comfort of the area being managed (for example, entire building) and turned off progressively in anticipation of occupancy diminishing. The understanding of occupancy patterns may also be applied at the aggregate level, in terms of the portion of a building, a building, a plurality of buildings, one or more portions in a plurality of buildings, a structure, a portion of a structure, an infra-structure, a portion of an infra-structure or combinations thereof.

In certain applications, the finer grained tuning of a building or area to each room and/or defined area may require a more detailed understanding of patterns of comfort, and this detail may be used to ensure that appropriate sections under management are heated and/or cooled, and that these patterns adjust to predicted behavior of people inside the area being managed. Certain embodiments are directed to systems, methods and/or devices that may be used to provide this finer grain tuning by collecting sufficient data on comfort. For example, comfort in a building, a portion of a building, a structure, a portion of a structure, an infra-structure, a portion of an infra-structure, a plurality of buildings, a plurality of structures, a plurality of infra-structures, or combinations thereof. Certain embodiments of the present disclosure are directed to systems, methods and/or devices that provide sufficient fine tuned control via a plurality of sensors such that comfort patterns may be determined and also sufficient control of one or more control systems via a plurality of control such that the building, areas of the building and/or individual rooms may be adjust in concert with one or more energy usage patterns.

In certain applications, data collected from feedback devices and/or one or more derived preference models may be at least in part used to determine or substantially determine occupancy. In certain applications one or more preference models may be used to predict or substantially predict future occupancy.

Creating and Using Behavioral Patterns

Certain embodiments are directed to systems, methods and/or devices, wherein data from the sensors and from the preference devices may be used at least in part to create one or more computer generated behavioral patterns, site occupation and/or site occupation patterns for the area under management based at least in part on data collected from the sensors and preference devices. The one or more computer generated behavioral patterns may be applied to a portion of a building, a building, individual rooms in a building, a plurality of buildings, one or more portions of a plurality of buildings, a structure, a portion of a structure, an infra-structure, a portion of an infra-structure, one or more portions of a plurality of structures, one or more portions of a plurality of infra-structures or combinations thereof. For example, one determinant of energy savings is the occupancy patterns and comfort patters of the area being managed, so the system may be adjusted based at least in part on the comfort of occupants, anticipated comfort of occupants, presence of occupants, absence of occupants, anticipated presence of occupants, anticipate absences of occupants or combinations thereof.

In certain aspects, this may be somewhat more complicated, because it may be desirable to know about occupancy and comfort at one or more levels of granularity and to use the data collected on one or more levels of granularity to provide one or more levels of control over the ability to adjust energy usage at the one or more portions of the area being managed. For example, the plurality of controllers may allow control of energy usage down to a room level of granularity (or substantial at room level of granularity), and in these applications, it may be useful to provide occupancy data at that level of granularity. In certain applications, it may be useful to address comfort and intensity of occupation, and not just presence. This is because warm blood mammals generate heat and consumes oxygen, and therefore more dense occupancy patterns (as in a meeting room or hall) may require more intense supply from heating and cooling systems than do areas of low occupancy density. In certain applications, some building systems or areas being managed (possibly excluding lighting) have inertia—they cannot reach a desired point instantly, and so it may be useful for these systems to anticipate the occupancy and comfort patterns and create optimal trajectories to reach the desired points with the occupancy and comfort patterns. In certain applications, it may be useful if the created optimal trajectories reach the desired points with the occupancy and comfort patterns simultaneously, substantially simultaneously or in an acceptable time period.

Certain embodiments are directed to systems, methods and/or devices that collect preference data and density data regarding occupancy, and correlates this with external data (such as time, day, month, season, room bookings and calendar appointments), and provide detailed, or substantially detailed, predictions of comfort and occupancy patterns and then use these detailed, or substantially detailed, predictions of comfort and occupancy patterns to adjust the settings and trajectories of building systems to maintain occupant comfort and reduce energy consumption.

In certain applications, occupancy data may be used in conjunction with feedback data to derive one or more preference models. In certain applications, the probability of receiving certain feedback or probability of receiving one or more of the possible feedbacks may be derived from feedback data and one or more of the following: occupancy data and occupancy density data. In certain applications, probability density function of receiving certain feedback or probability density function of receiving one or more of the possible feedbacks may be derived from feedback data and one or more of the following: occupancy data and occupancy density data.

Certain embodiments are directed to methods and/or systems, wherein a plurality of occupancy sensor devices, and a plurality of feedback devices deployed over an area, for example, in a building, in a portion of a building and/or in a plurality of buildings; and at least portion of the data received from at least a portion of the plurality of occupancy sensor devices and at least portion of the data received from at least a portion of the plurality of feedback devices is used to derive group preference.

Adjusting Environmental Conditions

Certain embodiments are directed to systems, methods and/or devices, wherein data is used to sufficiently optimize, to substantially optimize or to optimize environmental conditions of a portion of a building, a building, individual rooms in a building, a plurality of buildings, one or more portions of a plurality of buildings, a structure, a portion of a structure, an infra-structure, a portion of an infra-structure, one or more portions of a plurality of structures, one or more portions of a plurality of infra-structures or combinations thereof. In certain applications, this optimization may be achieved by determining neutral comfort bands. The neutral comfort bands may be determined by one or more of the following: taking into account individual variability in comfort perception, correlating occupants comfort level with perceived comfort and the external weather. The neutral comfort bands may change over season and over the external temperature. The neutral comfort bands may be further adjusted by noting that the behavioral response of outliers (groups or individuals who react at the far extreme of responses) often tend to regress to the norm when they are provided with continual feedback that their responses are outside of the normal range.

Certain embodiments are directed to systems, methods and/or devices that may be used to sufficiently optimize, substantially optimize or optimize the local environment inside an area being managed, by calibrating the target area of one or more buildings to the neutral comfort bands of the actual occupants and learning how the occupants react to changes in these conditions. The patterns of reaction and perception may be quite complex, and may vary from group to group.

Certain embodiments are directed to systems, methods and/or devices that may be used to minimize energy use, substantially minimize energy use or minimize energy use in the local environment inside an area by adjusting the daily load profile, and/or adjusting target settings, subject to the constraint that occupants remain substantially within neutral comfort bands.

Using certain disclosed embodiment, one or more of disclosed strategies may be applied to a large number of sites, and the resultant mix of environmental targets may be used to manage, or substantially manage, the overall load shape and predictability of the load curve, with resultant savings in energy purchase costs for the supplier. In certain embodiments, further savings in energy purchase costs may be achieved by promoting behavioral change of occupants by to creating comparative tables and/or performance graphs based on the variability amongst buildings. In certain applications, the savings in energy purchase costs may be between 2% to 10%, 5% to 15%, 10% to 30%, 20% to 70%, 50% to 150% or and 80% to 200%.

Patterns of Environmental Preferences of Occupants

Certain embodiments are directed to systems, methods and/or devices, wherein data is used to learn about and/or create pattern of environmental preferences of occupants of individual site and/or a plurality of sites. In certain aspects, these patterns of environmental preferences may be learned about and/or created for a portion of a building, a building, individual rooms in a building and/or a plurality of buildings and so forth. Occupant preferences may vary between individuals when they are asked to report on environmental comfort. Furthermore, individuals may be poor at estimating absolute levels, but may be individually quite consistent at reporting comparative preferences.

One aspect of improving and/or substantially maximizing the group comfort is to elicit preference choices from the occupants, and to associate these preference choices with a range of independent variables (such as external weather, season, time of day and so on). It may be useful in this process to ensure that responses are solicited from the whole group (or sufficiently representative samples of the group) as there may be an inherent bias in self reporting that emphasizes outliers in contrast to the average.

Certain embodiments are directed to obtaining preference patterns and reactions to current conditions by soliciting responses where the provision of the response has a sufficiently low transaction cost (in terms of time and effort). As transaction costs increase there may be a shift in the response patterns towards the average. This may not be desirable in certain applications.

Certain embodiments are directed to obtaining self-selected and/or self-initiated response patterns based on providing feedback responses that are positive, negative or neutral. The obtained probability curves (dependent on one or more independent variables) may be used to determine and/or predict underlying preferences based on assumptions regarding the likelihood of an individual providing a response based on their preferences.

In certain applications it may be assumed that individuals in a population follow a normal distribution curve, the more data that may be assembled regarding the interaction of preferences with external conditions and with various reporting mechanisms, then the more potentially accurate the average predictions may be. This aggregated data may also be used to provide feedback to individual participants regarding how their preferences differ from the average, and research shows that this may tend to create an effect where the individual regresses to the norm in their own perceptions Example 1

Figure 10:
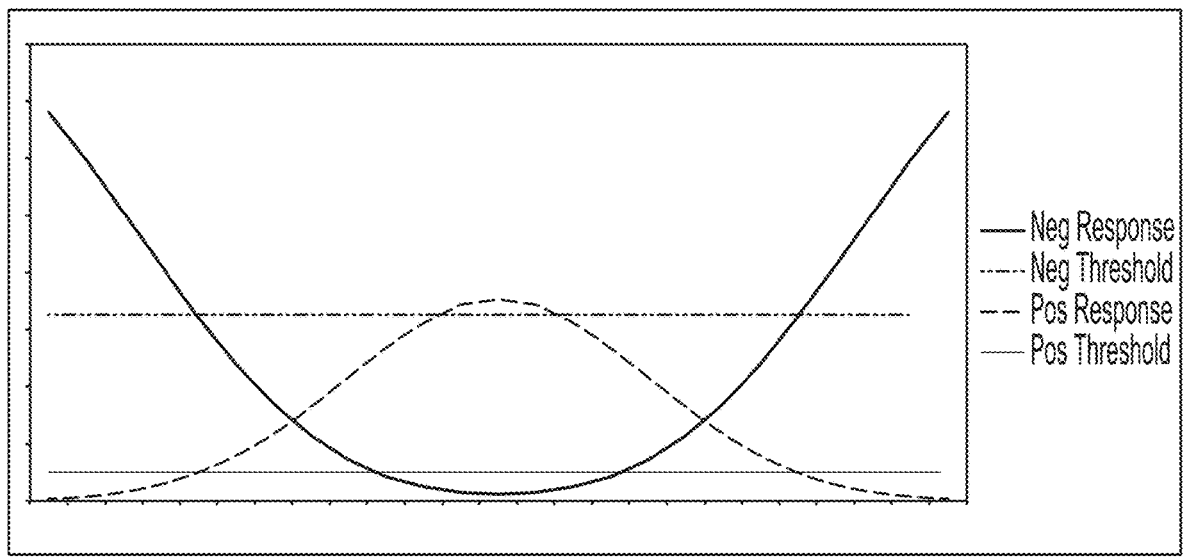
FIG. 10 depicts probability of negative and positive response amongst population at given temperature and time of the day.
Figure 11A:
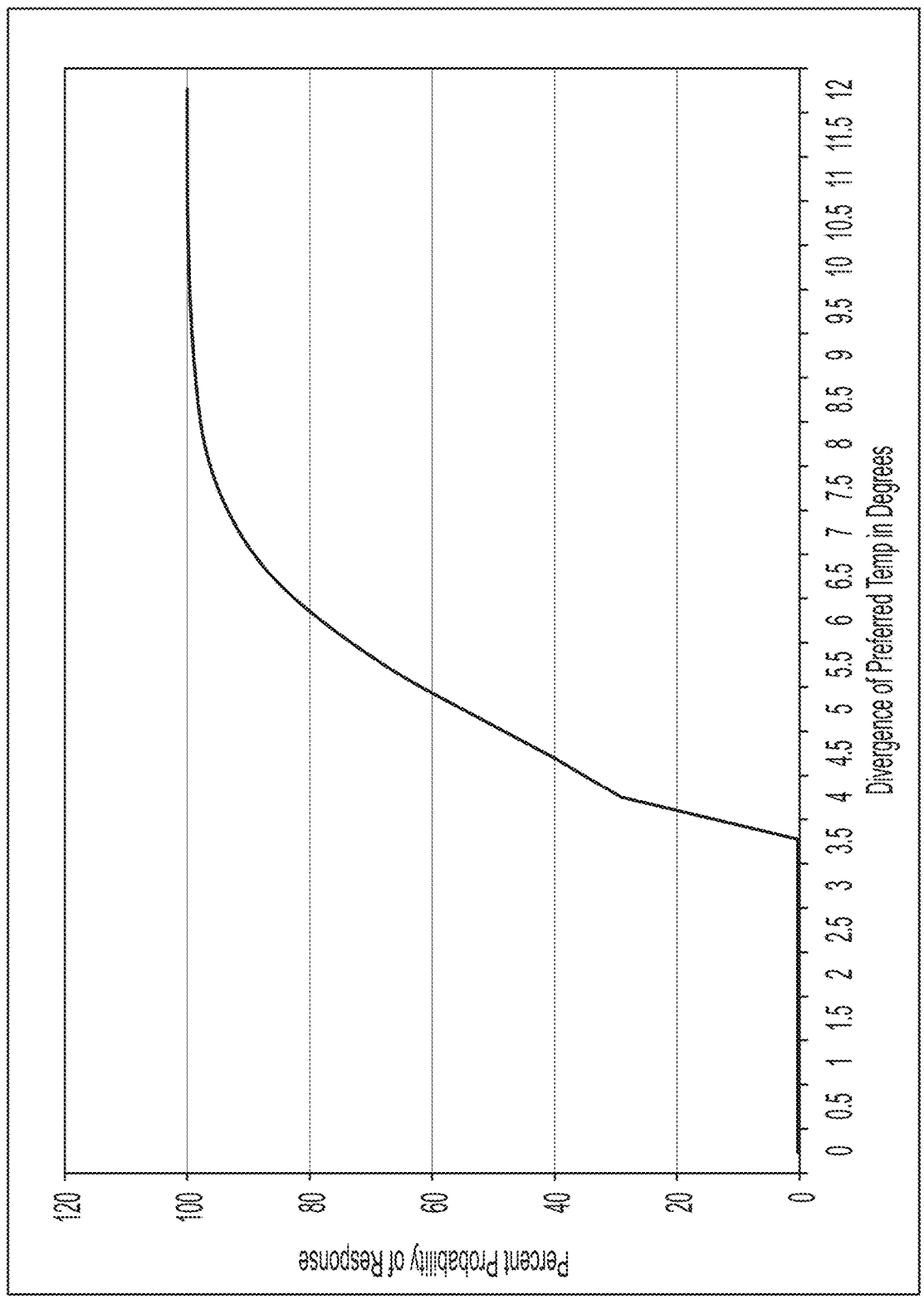
FIG. 11a depicts exemplary probability of negative individual feedback.
Figure 11B:
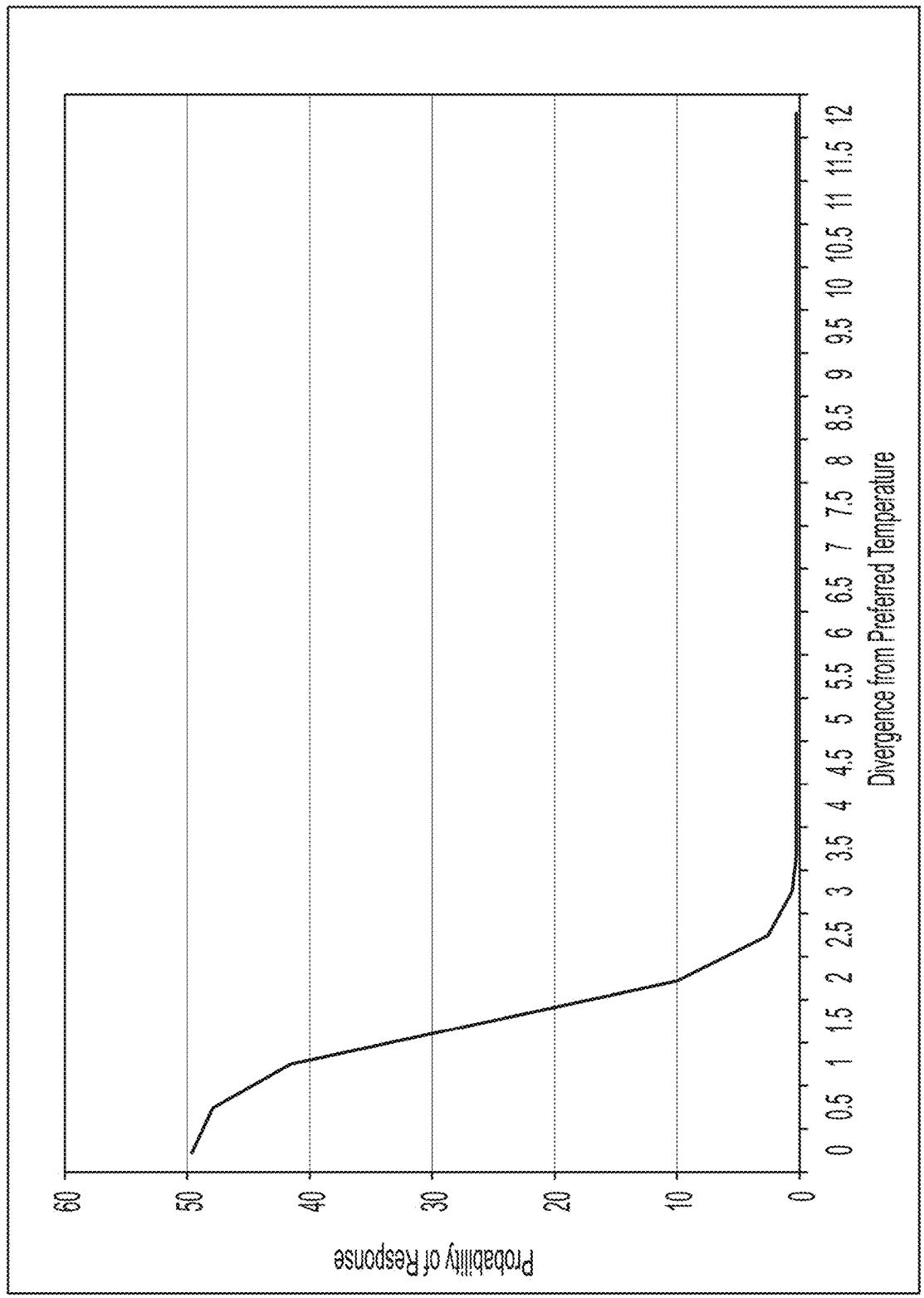
FIG. 11b depicts exemplary probability of positive individual feedback.
Figure 12:
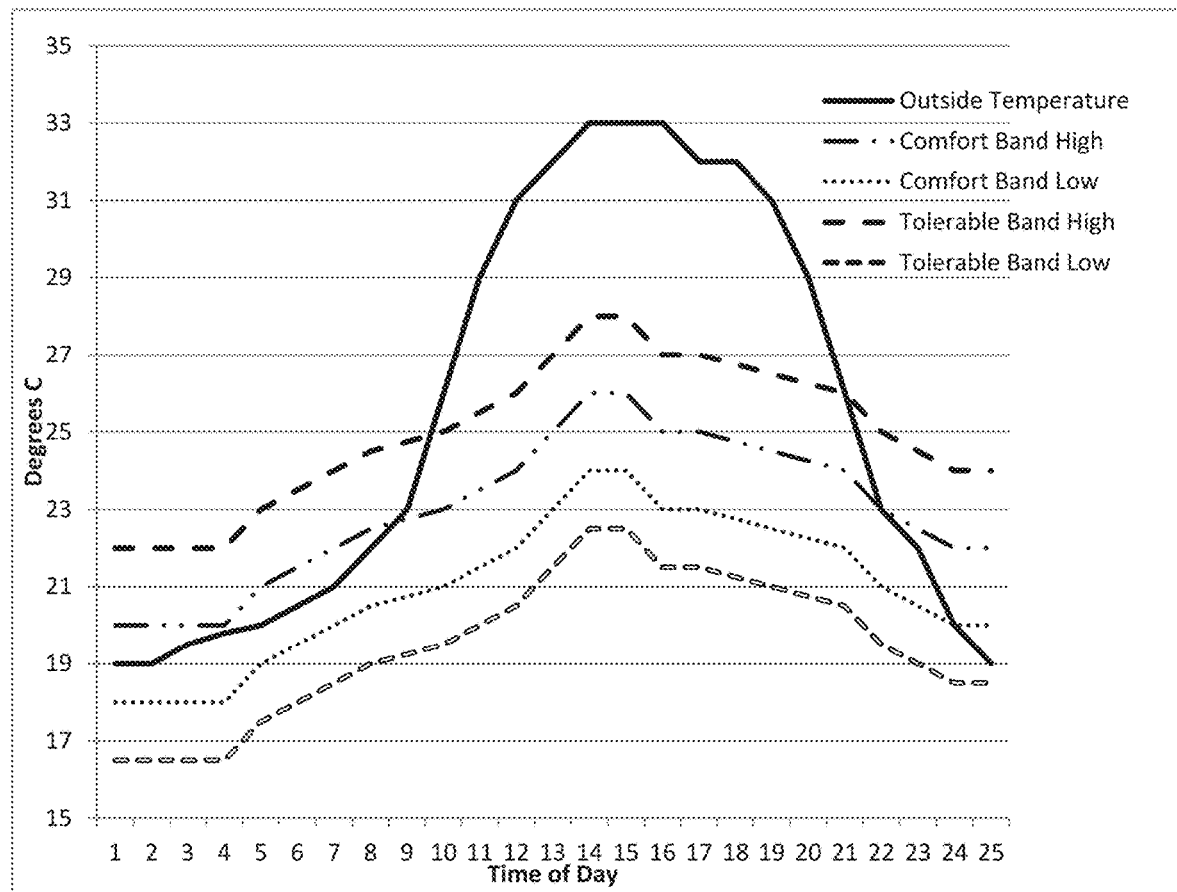
FIG. 12 shows exemplary temperature profiles.
Figure 13:
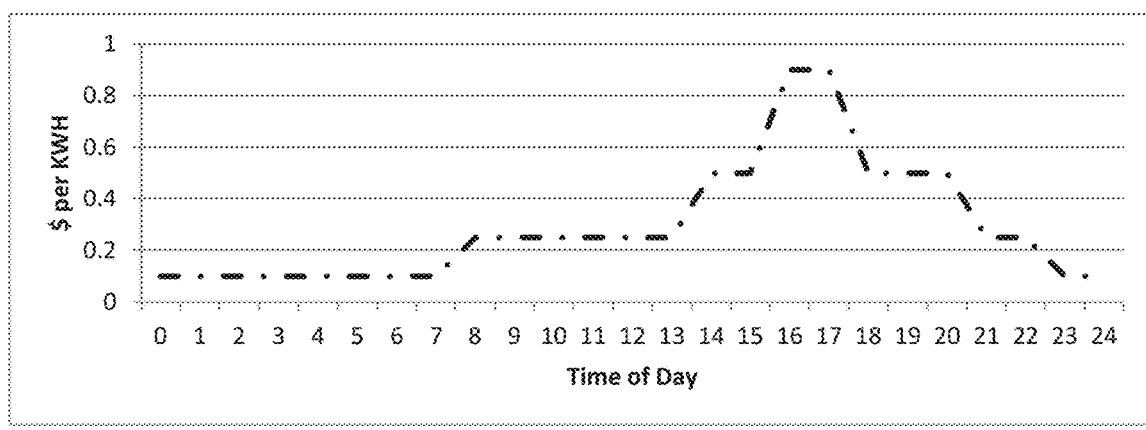
FIG. 13 shows exemplary power price profile.
Figure 14:
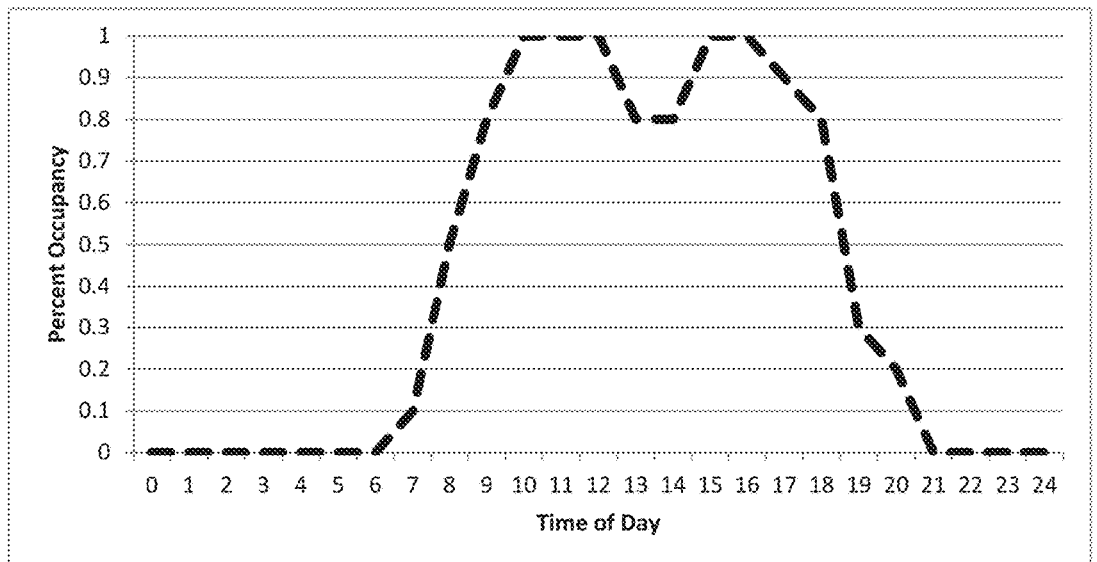
FIG. 14 shows exemplary occupancy profile of a building.
Figure 15:
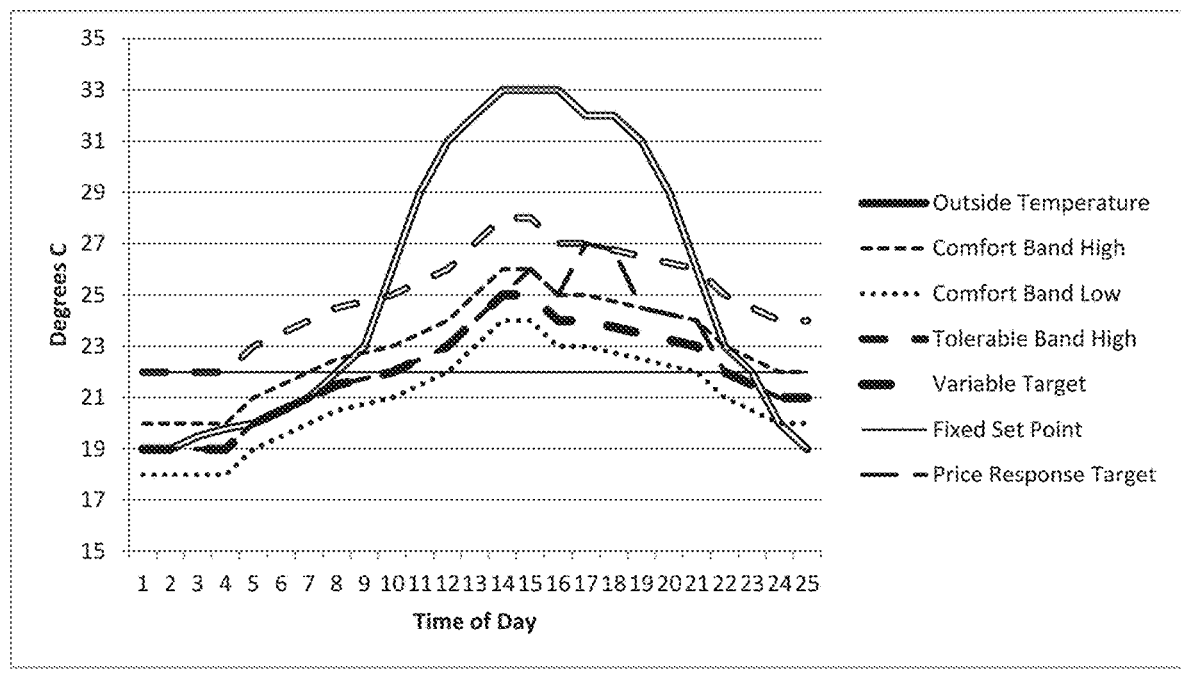
FIG. 15 shows exemplary HVAC set point strategies.
Figure 16:
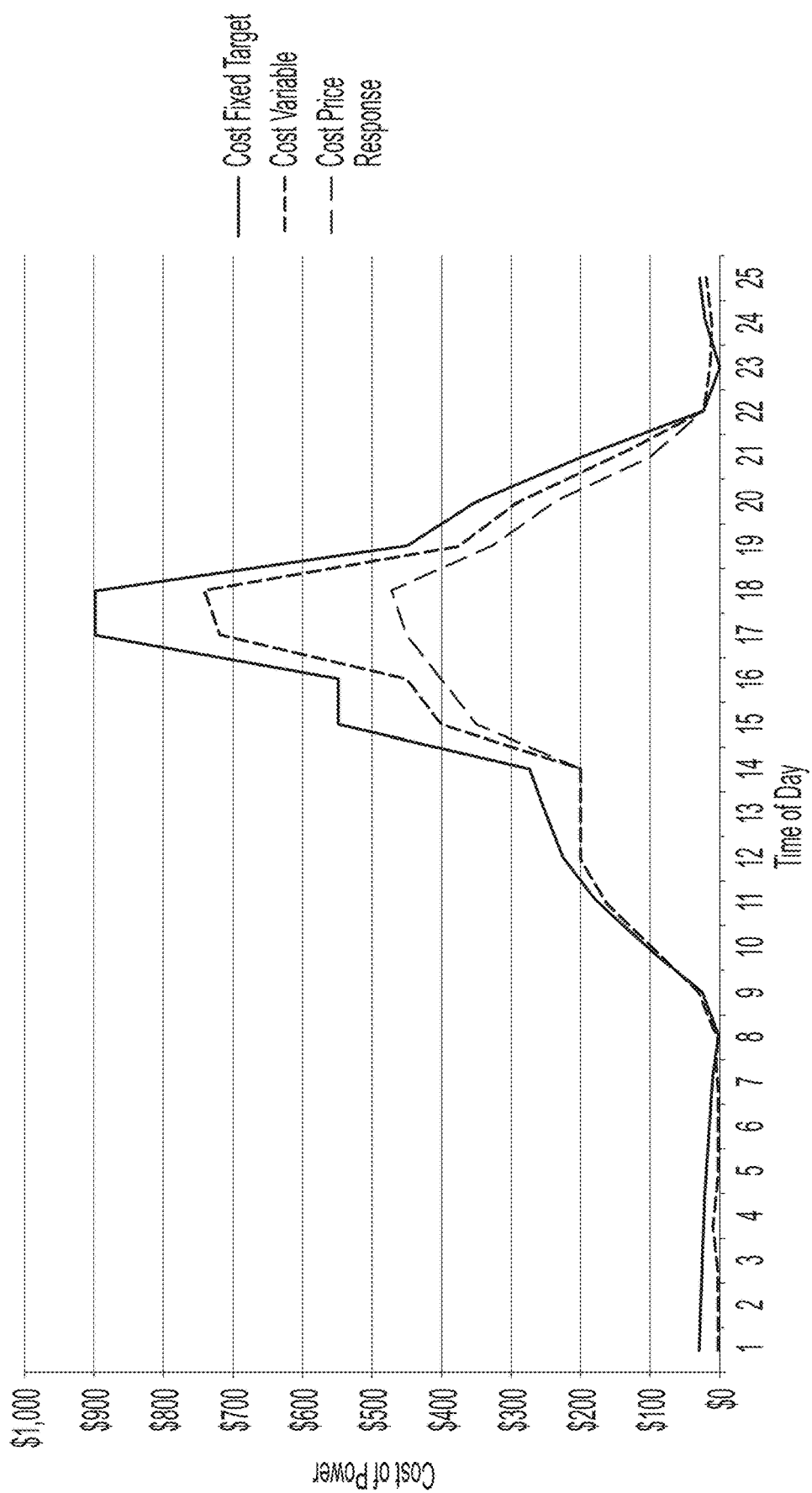
FIG. 16 shows exemplary impact of HVAC strategies on cost.
Figure 17:
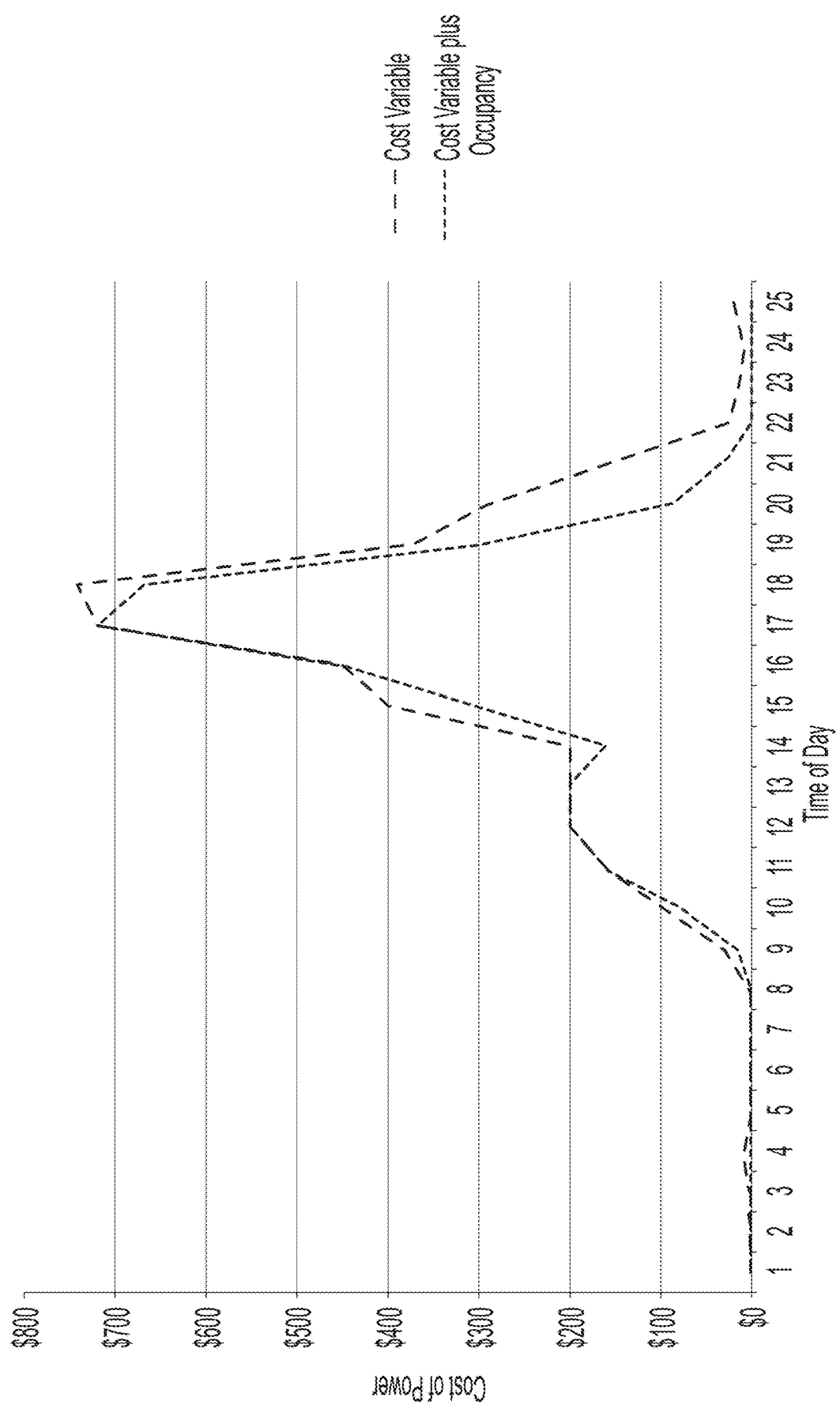
FIG. 17 shows exemplary impact of occupancy plus HVAC strategies on cost—variable set point.
Figure 18:
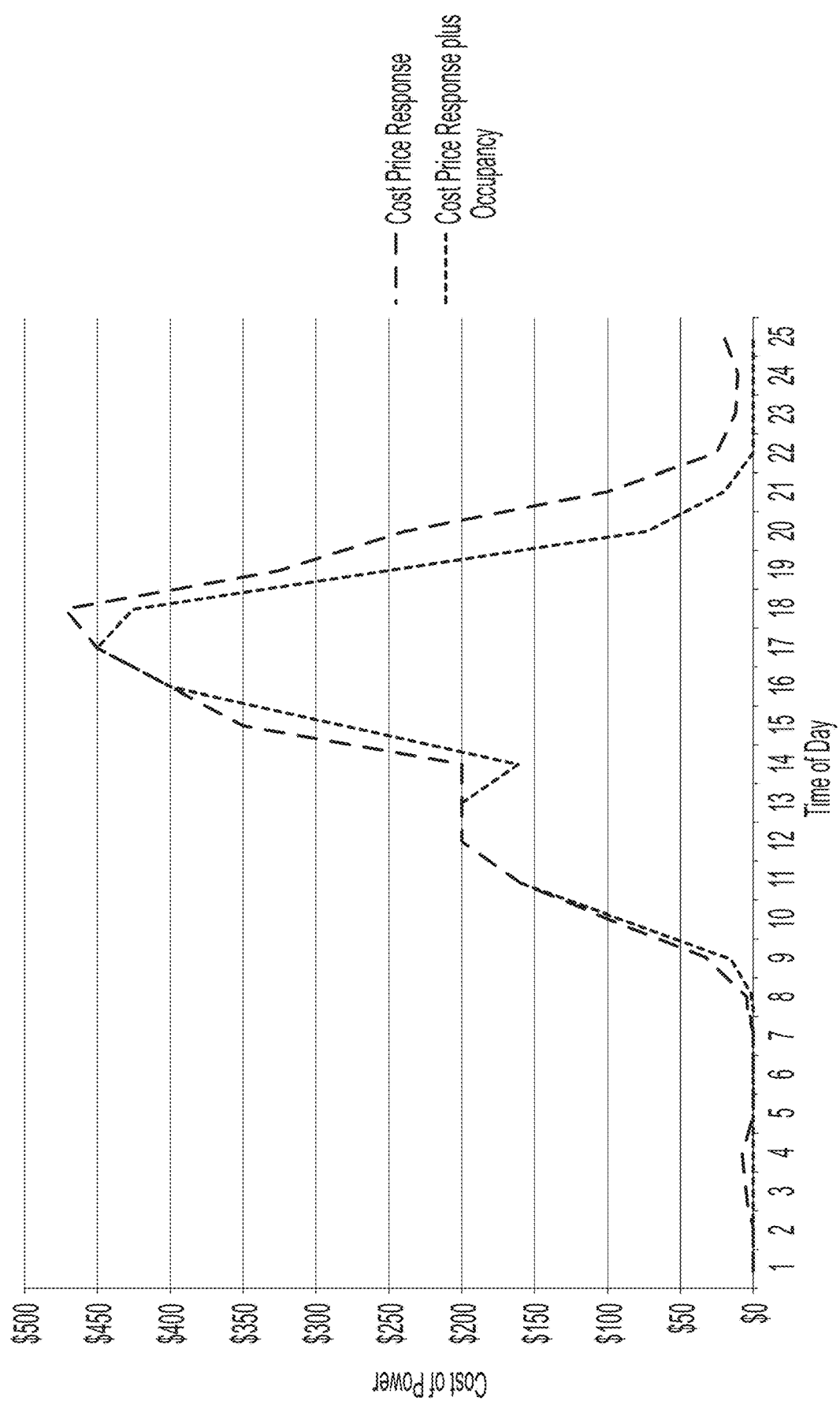
FIG. 18 shows exemplary impact of occupancy plus HVAC strategies on cost—price response set point.
Figure 19:
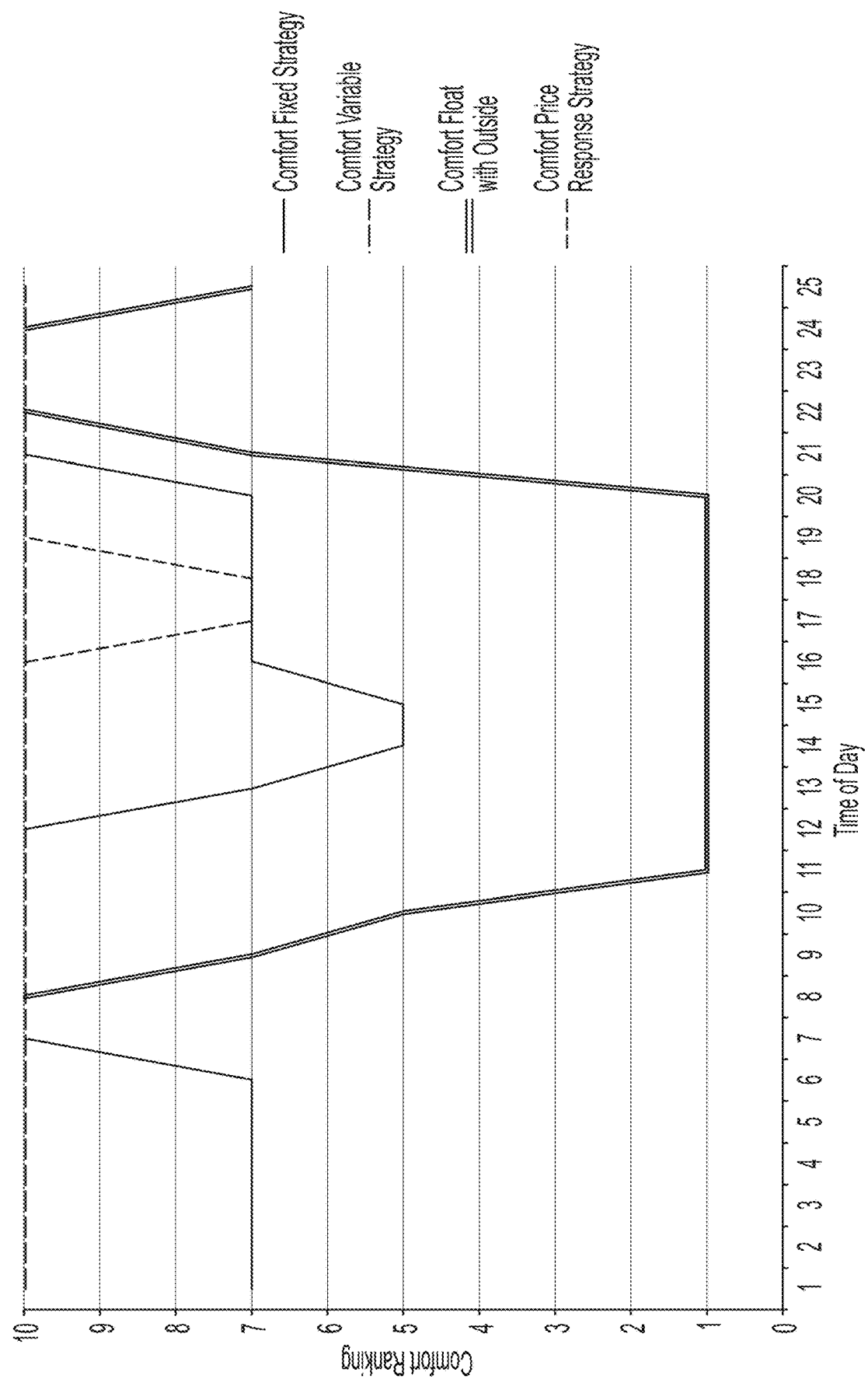
FIG. 19 shows exemplary impact of HVAC strategies on comfort.
Figure 20:
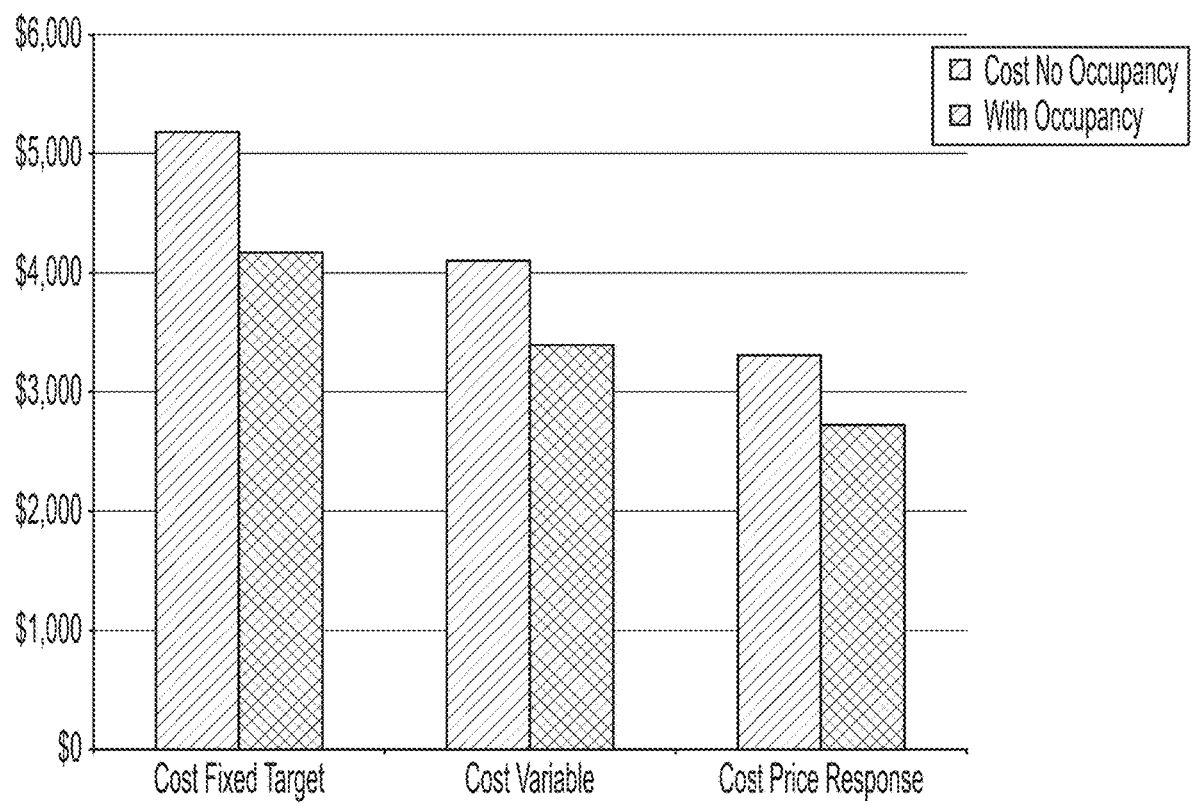
FIG. 20 shows exemplary cost of power—impact of occupancy and HVAC target setting.
Figure 21:
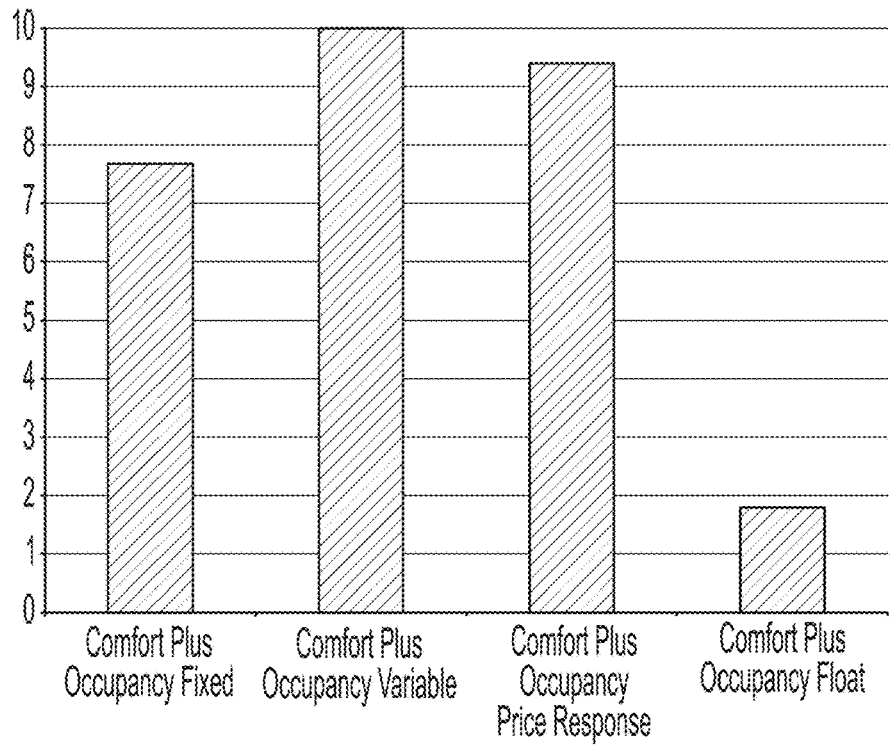
FIG. 21 shows exemplary impact of HVAC target settings on comfort weighted by occupancy.
Figure 22:
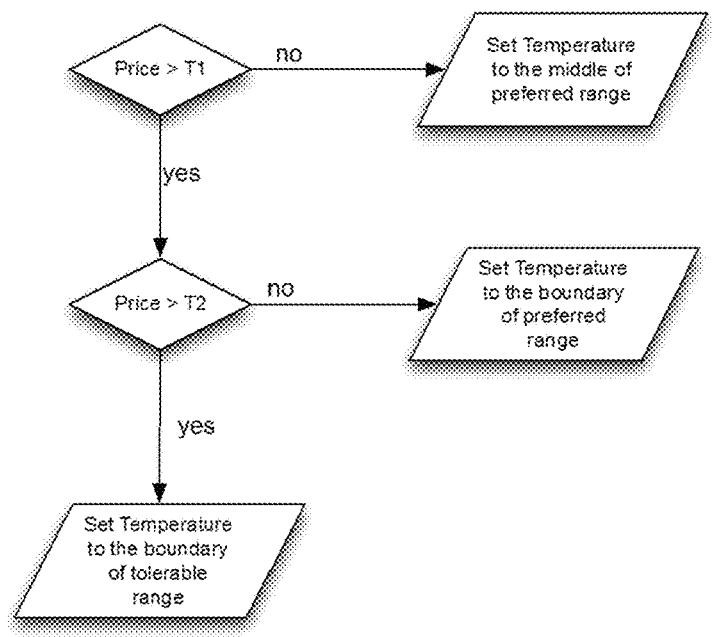
FIG. 22 shows an exemplary algorithm according to certain embodiments.

As depicted in FIG. 3, a plurality of sensors, controllers and feedback devices are deployed in a building. In this example, only the HVAC system is controlled. In other applications, it is also possible to control other systems, for example: lighting, water temperature, etc. FIG. 2 depicts exemplarily deployment of plurality of sensors, controllers and feedback devices on an individual floor. FIG. 13 shows typical daily power price profile. FIG. 14 shows typical occupancy profile of the building. FIG. 11 depicts probability of receiving negative (FIG. 11a) and positive (FIG. 11b) feedback. In this example, positive feedback is given by pressing the middle button of the feedback device shown on FIG. 1 and negative feedback is given by pressing a side button of the feedback device shown on FIG. 1. The feedback data received from feedback devices and sensor data was used to construct a group preference model of building occupants. FIG. 10 shows a snapshot of the group preference model, graphs shown refer to outside temperature of 33 degree C. at 14:00 on a weekday in February in Sydney. Crossing of "positive response" curve with "positive threshold" defines "comfort band" (or preferred range). Crossing of "negative response" curve with "negative threshold" defines "tolerable band". FIG. 12 shows comfort and tolerable bands and outside temperature throughout the day. Knowledge of group preference may be used to apply different HVAC strategies. In this example, only inside temperature is varied. The set point is varied by an appropriate controller based on received instructions. Other parameters may be varied as well, for example: humidity, flow of air, mixing rate of outside and inside air, etc. FIG. 15 shows various strategies that may be employed for selection of set point, according to certain embodiments. Fixed set point strategy is a typical strategy employed in prior art systems. One strategy is price response strategy. In this strategy the set point is kept at preferred level, unless price exceeds one or more threshold. FIG. 22 depicts an exemplary algorithm implementing this strategy. When price exceeds one or more thresholds the set point is moved to minimize the energy consumption while keeping the set point within comfort band or within tolerable band. Other strategies depicted in FIG. 15 are: (1) variable strategy—in this strategy the set point is kept within comfort band; (2) comfort band high—in this strategy the set point is kept close to the high end of comfort band; (3) comfort band low—in this strategy the set point is kept close to the low end of comfort band; (4) tolerable band high—in this strategy the set point is kept close to the high end of tolerable band; (5) tolerable band low—in this strategy the set point is kept close to the low end of tolerable band. FIG. 16 compares fixed set point, variable set point and price response strategies, according to certain embodiments. It can be seen from FIG. 16 that price response strategy offers substantial cost savings. FIG. 19 depicts comfort ranking for various strategies, according to certain embodiments. Comfort ranking of 10 is very comfortable; ranking of zero is very uncomfortable. FIGS. 19 and 16 show that price response strategy offers not only significant cost savings but also improves occupants' comfort. Taking occupancy into account offers further energy savings. FIG. 17 depicts further energy saving when applying variable set point strategy by combining knowledge of preference model and occupancy, according to certain embodiments. FIG. 18 depicts further energy saving when applying price target set point strategy by combining knowledge of preference model and occupancy. FIG. 20 compares energy cost when different strategies are applied, according to certain embodiments. FIG. 21 shows comfort ranking of different strategies, according to certain embodiments. Table 1 compares various strategies and cost savings they offer. Savings and percent of savings are compared against fixed target strategy (or typical prior art strategy). In this example, the price target strategy offers close to 50% reduction in energy cost.

TABLE 1

| Strategy\cost | per day | year | savings | % savings |
|---|---|---|---|---|
| Fixed Target | $5,177 | $1,346,020 | $0 | 0% |
| Variable | $4,104 | $1,067,105 | $278,915 | 21% |
| Price Response | $3,314 | $861,705 | $484,315 | 36% |
| Fixed Plus Occupancy | $4,168 | $1,083,550 | $262,470 | 19% |
| Variable plus Occupancy | $3,393 | $882,213 | $463,808 | 34% |
| Price Response plus Occupancy | $2,725 | $708,533 | $637,488 | 47% |

Example 2

FIG. 3 depicts an exemplary wireless mesh network formed by a plurality of sensors, controllers and feedback devices deployed in a 10 story building. In this example only HVAC system is controlled. In other applications it is also possible to control other systems, for example: lighting, water temperature, etc. FIG. 2 depicts exemplarily deployment of plurality of sensors, controllers and feedback devices on an individual floor. Table 2 shows typical communication parameters and device costs for the installed sensors, controllers and feedback devices.

TABLE 2

| Device | Bits received/ transmitted | Period (seconds) | Cost | Number of devices installed per floor |
|---|---|---|---|---|
| Temperature sensor | 16 | 20 | $8 | 30 |
| Humidity sensor | 16 | 20 | $10 | 8 |
| Air pressure sensor | 24 | 20 | $10 | 10 |
| Door/window open/close | 8 | 20 | $9 | 20 |
| Feedback device | 24 | 20 | $10 | 20 |
| A/C controller | 8 | 10 | $15 | 5 |

Devices operate in 2.4 GHz ISM band with physical layer baud rate of 250 kbits/second.

FIG. 13 shows typical daily power price profile. FIG. 14 shows typical occupancy profile of the building. FIG. 11 depicts probability of receiving negative (FIG. 11a) and positive (FIG. 11b) feedback. In this example, positive feedback is given by pressing the middle button of the feedback device shown on FIG. 1 and negative feedback is given by pressing a side button of the feedback device shown on FIG. 1. The feedback data received from feedback devices and sensor data was used to construct a group preference model of building occupants. FIG. 10 shows a snapshot of the group preference model, graphs shown refer to outside temperature of 33 degree C. at 14:00 on a weekday in February in Sydney. In this example, crossing of positive response curve with positive threshold defines comfort band (or preferred range). In this example, crossing of negative response curve with negative threshold defines tolerable band. FIG. 12 shows comfort and tolerable bands and outside temperature throughout the day. Knowledge of group preference may be used to apply different HVAC strategies. In this example, only inside temperature is varied. The set point is varied by an A/C controller based on instructions received from central computer or cloud based computing resource via the wireless mesh network. In certain applications, other parameters may be varied as well, for example: humidity, flow of air, mixing rate of outside and inside air, or combinations thereof. FIG. 15 shows various strategies that may be employed for selection of set point. Fixed set point strategy is a typical strategy employed in prior art systems. One exemplary strategy is a price response strategy. In this strategy, the set point is kept at preferred level, unless price exceeds one or more thresholds. FIG. 22 depicts an exemplary algorithm implementing this strategy. When price exceeds one or more thresholds the set point is moved to minimize the energy consumption while keeping the set point within comfort band or within tolerable band. Other strategies depicted in FIG. 15 are: (1) variable strategy—in this strategy the set point is kept within comfort band; (2) comfort band high—in this strategy the set point is kept close to the high end of comfort band; (3) comfort band low—in this strategy the set point is kept close to the low end of comfort band; (4) tolerable band high—in this strategy the set point is kept close to the high end of tolerable band; tolerable band low—in this strategy the set point is kept close to the low end of tolerable band; FIG. 16 compares fixed set point, variable set point and price response strategies. It can be seen from FIG. 16 that price response strategy offers high cost savings. FIG. 19 depicts comfort ranking for various strategies. Comfort ranking of 10 is "very comfortable", ranking of zero is "very uncomfortable". FIGS. 19 and 16 show that price response strategy offers not only significant cost savings but also improves occupants' comfort. Taking occupancy into account offers further energy savings. FIG. 17 depicts further energy saving when applying "variable set point" strategy by combining knowledge of preference model and occupancy. FIG. 18 depicts further energy saving when applying "price target set point" strategy by combining knowledge of preference model and occupancy. FIG. 20 compares energy cost when different strategies are applied. FIG. 21 shows comfort ranking of different strategies. Table 3 compares various strategies and cost savings they offer. Savings and percent of savings are compared against fixed target strategy (or typical prior art strategy). It can be clearly seen that price target strategy offers over three million dollars in energy cost savings for a typical building in 5 years.

TABLE 3

| Strategy/cost | per day | year | device cost | installation cost | savings per year | savings after 5 years |
|---|---|---|---|---|---|---|
| Fixed Target | $5,177 | $1,346,020 | $ 0 | | $ 0 | $ 0 |
| Variable | $4,104 | $1,067,105 | $8,750 | $5,000 | $278,915 | $1,380,825 |
| Price Response | $3,314 | $ 861,705 | $8,750 | $5,000 | $484,315 | $2,407,825 |
| Fixed Plus Occupancy | $4,168 | $1,083,550 | $8,750 | $5,000 | $262,470 | $1,298,600 |
| Variable plus Occupancy | $3,393 | $ 882,213 | $8,750 | $5,000 | $463,808 | $2,305,288 |
| Price Response plus Occupancy | $2,725 | $ 708,533 | $8,750 | $5,000 | $637,488 | $3,173,688 |

Other exemplary non-limiting embodiments are:

A1. A system comprising: a plurality of feedback devices for receiving a plurality of preferences and the plurality of preferences includes at least one first parameter, wherein the at least one first parameter has one or more of the following properties: observable, measurable, controllable, uncontrollable, observable and unobservable; at least one computer; at least one second parameter which is measurable; and wherein a measured value of the at least one second parameter is received by at least one computer and the plurality of feedback devices are configured to collect preference feedback from at least a portion of the plurality of individuals by permitting individual feedback to be actuated in a single action or in a single transaction at an individual feedback device of the plurality of feedback devices, wherein the single action or the single transaction may be actuated by an individual of the plurality of individuals during one or more of the following: periodic time intervals, predefined time intervals, random time intervals, substantially random time intervals and at substantially any time; wherein the plurality of feedback devices are configured to forward the preference feedback to the at least one computer; wherein the at least one computer performs one or more of the following: collects and/or stores a first set of data comprising one or more of the following: the preference feedback from the plurality of feedback devices; a statistics regarding a time corresponding to when an individual preference feedback was collected; a statistics regarding a time period corresponding to when the individual preference feedback was collected; a statistics regarding one or more times corresponding to when a plurality of preference feedbacks was collected; a statistics regarding one or more times corresponding to when one or more of preference feedbacks was collected; a statistics regarding one or more time periods corresponding to when the plurality of preference feedbacks was collected; a statistics regarding one or more time periods corresponding to when one or more of preference feedbacks was collected; statistics regarding how many times the individual feedback device of the plurality of feedback devices collected the plurality of preference feedbacks and how many times the individual feedback device of the plurality of feedback devices collected the individual preference feedback; collects and/or stores a second set of data comprising at least one measured value; provides instructions that may result in a change in the at least one second parameter; constructs at least one group preference model based at least in part on at least part of the first set of data and at least part of the second set of data, wherein the at least one group preference model predicts the future first set of data given the future second set of data; provides instructions in periodic time intervals, in real time, in substantial real time or combinations thereof, based on the at least one group preference model and on at least one measured physical parameter, wherein the instructions are directed to one or more of the following: maintain the future first set of data within a certain range; precipitate the future first set of data to a predefined range; move the future first set of data towards a certain range; maintain the future first set of data within a certain range while satisfying a constraint; precipitate the future first set of data to a predefined range while satisfying the constraint; and move the future first set of data towards a certain range while satisfying a constraint; and corrects, if needed, at least one group preference model based at least in part on at least part of the first set of data and at least part of the second set of data.

A2. A system comprising: at least one computer; and a plurality of feedback devices configured to collect preference feedback input by permitting individual feedback to be actuated in a single action or in a single transaction at an individual feedback device of the plurality of feedback devices; wherein the plurality of feedback devices are configured to forward the preference feedback to the at least one computer; wherein the single action or the single transaction is actuated by an individual in periodic time intervals, predefined time intervals, random time intervals, substantially random time intervals and/or at substantially any time; wherein the at least one computer comprises: at least one memory for storing a first set of data comprising at least: (i) the preference feedback from the plurality of feedback devices; (ii) a time corresponding to when the preference feedback was collected; and (iii) how many times a particular one of the plurality of feedback devices collected the preference feedback; and at least one processor for: (i) aggregating the preference feedback from the plurality of feedback devices; and (ii) constructing at least one group preference model based at least in part on at least part of the first set of data and one or more other measured physical parameters, wherein the at least one group preference model is based at least in part on a set of variables that are not directly observable; and (iii) providing instructions based on the at least one group preference model, wherein the instructions provide input to maintain modeled group preferences within a certain range or to move the modeled group preferences towards a certain range while optimizing a predetermined resource.

A3. A system comprising: at least one computer; a plurality of devices configured to execute instructions, wherein the instructions are provided by at least one computer; and a plurality of feedback devices configured to collect preference feedback input in substantially real time and at a substantially low transaction cost by permitting individual feedback to be actuated in a single action or in a single transaction; wherein the plurality of feedback devices are configured to forward the preference feedback to the at least one computer; wherein the one single action or one single transaction may be actuated by an individual at periodic time intervals, predefined time intervals, random time intervals, substantially random time intervals or substantially any time; wherein the at least one computer performs one or more of the following: (a) collects and/or stores a first set of data comprising one or more of the following: the preference feedback from the plurality of feedback devices; a statistics regarding a time corresponding to when individual preference feedback was collected; a statistics regarding a time period corresponding to when the individual preference feedback was collected; a statistics regarding one or more times corresponding to when a plurality of preference feedbacks was collected; a statistics regarding one or more time periods corresponding to when the plurality of preference feedbacks was collected; and how many times an individual feedback device of the plurality of feedback devices collected the preference feedback; (b) constructs at least one group preference model based at least in part on at least part of the first set of data and one or more other measured physical parameters, wherein the at least one group preference model is based at least in part on a set of variables that are not directly observable; (c) provides instructions in periodic time intervals, in real time, in substantial real time or combinations thereof based on the at least one group preference model and on at least one measured physical parameter, wherein the instructions are directed to maintain modeled group preferences within a certain range or to move the modeled group preferences towards a certain range while keeping predetermined resource within predefined range; and (d) corrects, if needed, at least one group preference model based at least in part on at least part of the first set of data and one or more other measured physical parameters, wherein the at least one group preference model is based at least in part on a set of variables that are not directly observable.

A4. The system of one or more of the proceeding A examples further comprising: a second set of a plurality of feedback devices configured to collect preference feedback input within a second system by permitting individual feedback to be actuated by performing one single action or one single transaction at an individual feedback device of the plurality of feedback devices and the second set of the plurality of feedback devices are configured to forward the collected preference feedback to at least one computer; the at least one computer aggregates the preference feedback from the plurality of feedback devices and constructs at least one group preference model based at least in part on the aggregated feedback and one or more other measured physical parameters, wherein the at least one group preference model is based at least in part on a set of fuzzy variables that are not directly observable; and the at least one computer provides instructions based on the constructed at least one group preference model and those instructions provide input to the second system to maintain group preferences within the second system within a certain range or to move the group preferences within the second system towards the certain range.

A5. The system of one or more of the proceeding A examples, wherein the at least one condition is an environmental condition.

A6. The system of example A5, wherein the environmental condition is a temperature.

A7. The system of one or more of the proceeding A examples, wherein the plurality of feedback devices feedback device provide an indication of direction of future movement of the at least one second parameter.

A8. The system of one or more of the proceeding A examples, wherein the plurality of feedback devices provide an indication of direction of future movement of the at least one first parameter.

A9. The system of one or more of the proceeding A examples, wherein the at least one group preference model is defined by one or more of the following: at least one tolerable region, at least one intolerable region, at least one acceptable region and at least one preferred region.

A10. The system of one or more of the proceeding A examples, wherein the at least one group preference model is constructed by aggregating individual preference models.

A11. The system of example A10, wherein the aggregation may be fuzzy AND function.

A12. The system of one or more of the proceeding A examples, wherein the at least one second parameter is adjusted, based at least in part on the aggregate preference of the plurality of individuals, to an acceptable level for a majority, or a substantial portion, of the plurality of individuals.

A13. The system of one or more of the proceeding A examples, wherein the at least one computer generates and stores information related to the probability of obtaining one or more of the following: negative feedback, positive feedback and neutral feedback; based at least in part on the aggregate preference of a majority, or a substantial portion of, the plurality of individuals.

A14. The system of one or more of the proceeding A examples, wherein the at least one computer is a processor, computing device, computer, cloud based computing resource or combinations thereof.

A15. The system of one or more of the proceeding A examples, wherein the at least one computer is the processor and/or the cloud based computing resource.

A16. The system of one or more of the proceeding A examples, wherein the plurality of feedback devices are configured to collect preference feedback input in periodic time intervals and/or substantially real time at a low transaction cost.

A17. The system of one or more of the proceeding A examples, wherein the plurality of feedback devices are configured to collect preference feedback input at a low transaction cost.

A18. The system of one or more of the proceeding A examples, wherein the single transaction comprises: one, two or three actions.

B1. A preference indication device for use in a system in which the system is configured for setting and/or adjusting at least one condition, the preference indication device being configured to be used in a network containing a plurality of additional preference indication devices and at least one computer, the preference indication device comprising: an interface configured to permit an individual to input preference information corresponding to the at least one condition; and a transmitter for transmitting the preference information to at least one computer; a receiver for receiving information representative of an aggregate preference of a plurality of individuals from the at least one computer, the aggregate preference being based at least in part on preference information transmitted to the at least one computer by the preference indication device and the plurality of additional preference indication devices.

B2. A preference indication device for use in a system in which the system is configured for setting and/or adjusting at least one condition, the preference indication device being configured to be used in a network containing a plurality of additional preference indication devices and at least one computer, the preference indication device comprising: an interface configured to permit an individual to input preference information corresponding to the at least one condition; and a transmitter for transmitting the preference information to at least one computer; a receiver for receiving information representative of an aggregate preference of a plurality of individuals from the at least one computer, the aggregate preference being based at least in part on preference information transmitted to the at least one computer by the preference indication device and the plurality of additional preference indication devices.

B3. The preference indication device of one or more of the proceeding B examples, wherein the device further comprises a display for displaying a visual indication of the aggregate preference of the plurality of individuals to encourage further input of preference information to the preference indication device.

B4. The preference indication device of one or more of the proceeding B examples, wherein the device further comprises at least one LED for displaying a visual indication of the aggregate preference of the plurality of individuals to encourage further input of preference information to the preference indication device.

B5. The preference indication device of one or more of the proceeding B examples, wherein the receiver is further configured to receive preference information from at least one of the plurality of additional preference indication devices and the transmitter is configured to transmit the received preference information from the at least one of the plurality of additional preference indication devices to another one of the plurality of additional preference indication devices and/or the at least one computer.

B6. The preference indication device of one or more of the proceeding B examples, wherein the at least one condition is an environmental condition.

B7. The preference indication device of one or more of the proceeding B examples, wherein the environmental condition is a temperature.

B8. The preference indication device of one or more of the proceeding B examples, wherein the device provides an indication of direction of future movement of the at least one second parameter.

B9. The preference indication device of one or more of the proceeding B examples, wherein the device or feedback device provides an indication of direction of future movement of the at least one first parameter.

B10. The preference indication device of one or more of the proceeding B examples, wherein the device further interface comprises at least one button for indicating a negative feedback and at least one button for indicating a positive feedback.

B11. The preference indication device of one or more of the proceeding B examples, wherein the device comprises at least one first button that indicates a desire to increase the at least one first parameter; at least one second button may that indicate a desire to decrease the at least one first parameter; and at least one third button that indicates a desire to keep the at least one first parameter substantially constant.

C1. A system for setting and/or adjusting a temperature profile within a building, the system comprising: at least one computer; a plurality of sensors for measuring temperature and transmitting the measured temperature to the at least one computer; a plurality of preference indication devices that are communicatively coupled to the at least one computer, the preference indication devices comprising: (i) an interface configured to permit an individual to input preference information indicating whether the current temperature is above an acceptable temperature, at an acceptable temperature, or below an acceptable temperature, wherein the transaction cost of imputing preference information may be made substantially low by permitting the individual to input the preference information in a single action or a single transaction; (ii) a transmitter for transmitting the preference information to the at least one computer; and (iii) a receiver for receiving an instruction to display a third set of data from the at least one computer; wherein the at least one computer is capable of: (a) receiving the preference information from the plurality of preference indication devices and the temperature information from the plurality of sensors; (b) aggregating the preference information from the plurality of preference indication devices and generating, based at least in part on the preference information from the plurality of preference indication devices, the aggregate preference information; and (c) transmitting the third set of data to the plurality of preference indication devices and transmitting an instruction to at least one controller for adjusting the temperature profile within the building.

C2. The system of one or more of the proceeding C examples, wherein one or more of the preference indication devices further comprises a display and/or set of LEDs for displaying the third set of data to encourage further input of preference information.

C3. The system of one or more of the proceeding C examples, wherein the at least one computer aggregates the aggregate preference information in substantially real time.

C4. The system of one or more of the proceeding C examples, wherein the third set of data is a direction of movement of the at least one second parameter and/or the at least one first parameter.

C5. The system of one or more of the proceeding C examples, wherein the receiver in the plurality of preference indication devices is further configured to receive preference information from at least one other of the plurality of preference indication devices and/or the at least one computer and the transmitter in the plurality of preference indication devices is configured to transmit the received preference information from the at least one other of the plurality of preference indication devices to another one of the plurality of preference indication devices and/or the at least one computer.

C6. The system of one or more of the proceeding C examples, wherein the at least one computer is configured to generate at least one tolerable region, at least one intolerable region, at least one acceptable region and at least one preferred region of the temperature profile based at least in part on the aggregate preference of a plurality of individuals.

C7. The system of one or more of the proceeding C examples, wherein the target temperature may be adjusted, based at least in part on the aggregate preference of at least part of the plurality of individuals, to an acceptable level for a majority of the plurality of individuals.

C8. The system of one or more of the proceeding C examples, wherein the target temperature may be adjusted, based at least in part on the aggregate preference of at least part of the plurality of individuals, to an acceptable level for at least 60%, 65%, 70%, 75%, 80%, 85%, 90% or 95% of the plurality of individuals.

C9. The system of one or more of the proceeding C examples, wherein the at least one computer may generate and store statistical information related to the acceptability of the target temperature, based at least in part on the aggregate preference of the plurality of individuals.

C10. The system of one or more of the proceeding C examples, wherein the at least one computer generates and stores information related to the probability of obtaining one or more of the following: negative feedback, positive feedback and neutral feedback, based at least in part on the aggregate preference of the plurality of individuals.

C11. The system of one or more of the proceeding C examples, wherein the target temperature may be adjusted in real-time, in substantially real time, in periodic time intervals, in predefined time intervals, in random time intervals or combinations thereof.

C12. The system of one or more of the proceeding C examples, wherein the controller may adjust the temperature profile if the at least one computer determines that a predetermined percentage of the plurality of individuals do not find the at least first parameter to be at an acceptable level.

C13. The system of one or more of the proceeding C examples, wherein the target temperature may be adjusted, based at least in part on the aggregate preference of at least a part of the plurality of individuals and at least in part on the additional data received by the at least one computer.

C14. The system of one or more of the proceeding C examples, wherein the at least one computer sends instructions to the at least one controller to perform an action that may result in maintaining or adjusting the target temperature within the building based at least in part on the aggregate preference of at least a part of the plurality of individuals and the additional data.

C15. The system of one or more of the proceeding C examples, wherein the instruction may be a request to adjust the temperature in one or more of the following: the building, at least a portion of the building, a room within the building, a specific level of the building and an area within the building.

D1. A method for providing instructions regarding system settings comprised of: deploying a plurality of feedback devices configured to collect preference feedback input within a system by permitting individual feedback to be actuated by performing a single action or a single transaction, and the single action or the single transaction may be actuated at periodic time intervals, predefined time intervals, random time intervals, substantially random time intervals and/or substantially any time and the plurality of feedback devices are configured to forward the collected preference feedback to an at least one computer;

aggregating the preference feedback from the plurality of feedback devices and constructing at least one group preference model based at least in part on the aggregated feedback and one or more other measured physical parameters with assistance of the at least one computer, wherein the at least one group preference model is based at least in part on a set of fuzzy variables that are not directly observable; and providing instructions based on the constructed at least one group preference model and those instructions provide input to the system to achieve one or more of the following: maintain group preferences within the system within a certain range, to move the group preferences within the system towards a certain range and to generate more feedback.

D2. A method for setting and/or adjusting the at least one second parameter, the method comprising: obtaining preference information corresponding to the at least one second parameter from a plurality of individuals using a corresponding plurality of preference feedback devices; transmitting the preference information from the plurality of preference feedback devices to at least one computer, wherein the at least one computer is configured to aggregate the preference information to determine an aggregate preference of the plurality of individuals; receiving information representative of the aggregate preference by the plurality of preference indication devices; and displaying a visual indication of the aggregate preference of the group on at least a portion of the plurality of preference indication devices to encourage at least part of the plurality of individuals to provide preference information D3. The method of one or more of the proceeding D examples, wherein the at least one second parameter is an environmental parameter.

D4. The method of example D3, wherein the environmental parameter is a temperature.

D5. The method of one or more of the proceeding D examples, wherein the preference information is one of a negative feedback, a positive feedback or a neutral feedback.

D6. The method of one or more of the proceeding D examples, wherein the negative feedback is one of increase of the at least one second parameter or decrease of the at least one second parameter.

D7. The method of one or more of the proceeding examples, wherein the negative feedback is one of increase of the at least one first parameter or decrease of the at least one first parameter.

D8. The method of one or more of the proceeding examples, wherein the positive feedback is that the at least one first parameter is acceptable.

D9. The method of one or more of the proceeding D examples, wherein the positive feedback is that the at least one second parameter is acceptable.

D10. The method of one or more of the proceeding D examples, wherein the at least one second parameter is adjusted, based at least in part on the aggregate preference of the plurality of individuals, to an acceptable level for a majority of the plurality of individuals.

D11. The method of one or more of the proceeding D examples, wherein the at least one second parameter is adjusted, based at least in part on the aggregate preference of the plurality of individuals, to an acceptable level for at least 60%, 65%, 70%, 75%, 80%, 85%, 90% or 95% of the plurality of individuals.

D12. The method of one or more of the proceeding D examples, wherein the at least one computer generates and stores statistical information related to the acceptability of the at least one first parameter, based at least in part on the aggregate preference of the plurality of individuals.

D13. The method of one or more of the proceeding D examples, wherein the at least one computer generates and stores information related to the probability of obtaining one or more of the following: negative feedback, positive feedback, no feedback and neutral feedback, based at least in part on the aggregate preference of the plurality of individuals.

D14. The method of one or more of the proceeding D examples, wherein the aggregate preference of the plurality of individuals is based on at least 60%, 65%, 70%, 75%, 80%, 85%, 90% or 95% of the preference of the individuals making up the plurality of individuals.

D15. The method of one or more of the proceeding D examples, wherein the method further provides for transmitting at least one instruction to a controller responsible for controlling the at least one second parameter to adjust the at least one second parameter.

D16. The method of one or more of the proceeding examples, wherein the controller does not adjust the at least one second parameter unless the at least one computer determines that a predetermined percentage of the plurality of individuals do not find the at least one first parameter is at an acceptable level.

D17. The method of one or more of the proceeding D examples, wherein the controller may adjust the at least one second parameter if the at least one computer determines that a probability of receiving at least one negative feedback in a substantially predetermined interval exceeds a predetermined threshold.

D18. The method of one or more of the proceeding D examples, wherein the controller may adjust the at least one second parameter if the at least one computer determines that a probability of receiving at least one positive feedback in a substantially predetermined interval is below a predetermined threshold.

D19. The method of one or more of the proceeding D examples, wherein the controller may adjust the at least one second parameter if the at least one computer determines that a probability of not receiving at least one feedback in a substantially predetermined interval is below a predetermined threshold.

D20. The method of one or more of the proceeding D examples, wherein the controller may adjust the at least one second parameter if the at least one computer determines that a probability of receiving at least one neutral feedback in a substantially predetermined interval is below a predetermined threshold.

D21. The method of one or more of the proceeding D examples, wherein the at least one second parameter may be adjusted, based at least in part on the aggregate preference of at least a part of the plurality of individuals and at least in part on additional data received by the at least one computer.

D22. The method of one or more of the proceeding D examples, wherein the at least one second parameter is the temperature in a building and the additional data comprises one or more of the following: sunrise time, sunset time, current outdoor temperature, cost of energy and combinations thereof.

D23. The method of one or more of the proceeding D examples, wherein the at least one computer sends instructions to a controller to maintain or adjust the temperature within the building based at least in part on the aggregate preference at least a part of the plurality of individuals and the additional data.

D24. The method of one or more of the proceeding D examples, wherein the instruction may be a request to adjust the temperature in one or more of the following: the building, at least a portion of the building, a room within the building, an area within the building, and a specific level of the building.

D25. The method of one or more of the proceeding D examples, wherein the at least one computer is a processor, computing device, computer, cloud based computing resource or combinations thereof.

D26. The method of one or more of the proceeding D examples, wherein the at least one computer is the processor and/or cloud based computing resource.

D27. The method of one or more of the proceeding D examples, wherein the plurality of feedback devices are configured to collect preference feedback input in periodic time intervals and/or substantially real time at a low transaction cost.

D28. The method of one or more of the proceeding D examples, wherein the plurality of feedback devices are configured to collect preference feedback input at a low transaction cost.

D29. The method of one or more of the proceeding D examples, wherein the single transaction comprises: one, two or three actions.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. Variations and equivalents are intended to be embraced.

What is claimed is:

1. A system comprising:
a plurality of feedback devices for receiving a plurality of preferences and the plurality of preferences includes at least one first parameter, wherein the at least one first parameter has one or more of the following properties: observable, measurable, controllable, uncontrollable and unobservable;

at least one computer;

at least one second parameter which is measurable; and wherein a measured value of the at least one second parameter is received by at least one computer and the plurality of feedback devices are configured to collect preference feedback from at least a portion of the plurality of individuals by permitting individual feedback to be actuated in a single action or in a single transaction at an individual feedback device of the plurality of feedback devices, wherein the single action or the single transaction may be actuated by an individual of the plurality of individuals during one or more of the following: periodic time intervals, predefined time intervals, random time intervals, substantially random time intervals and at substantially any time; wherein the plurality of feedback devices are configured to forward the preference feedback to the at least one computer; wherein the at least one computer performs one or more of the following:

collects, stores, or a combination thereof, a first set of data comprising one or more of the following: the preference feedback from the plurality of feedback devices; a statistics regarding a time corresponding to when an individual preference feedback was collected; a statistics regarding a time period corresponding to when the individual preference feedback was collected; a statistics regarding one or more times corresponding to when a plurality of preference feedbacks was collected; a statistics regarding one or more times corresponding to when one or more of preference feedbacks was collected; a statistics regarding one or more time periods corresponding to when the plurality of preference feedbacks was collected; a statistics regarding one or more time periods corresponding to when one or more of preference feedbacks was collected; statistics regarding how many times the individual feedback device of the plurality of feedback devices collected the plurality of preference feedbacks and how many times the individual feedback device of the plurality of feedback devices collected the individual preference feedback;

collects, stores, or a combination thereof, a second set of data comprising at least one measured value; provides instructions that may result in a change in the at least one second parameter; constructs at least one group preference model based at least in part on at least part of the first set of data and at least part of the second set of data, wherein the at least one group preference model predicts the future first set of data given the future second set of data;

provides instructions in periodic time intervals, in real time, in substantial real time or combinations thereof, based on the at least one group preference model and on at least one measured physical parameter, wherein the instructions are directed to one or more of the following: maintain the future first set of data within a certain range; precipitate the future first set of data to a predefined range; move the future first set of data towards a certain range;

maintain the future first set of data within a certain range while satisfying a constraint; precipitate the future first set of data to a predefined range while satisfying the constraint; and move the future first set of data towards a certain range while satisfying a constraint; and corrects, if needed, at least one group preference model based at least in part on at least part of the first set of data and at least part of the second set of data.

2. A system comprising:

at least one computer; and a plurality of feedback devices configured to collect preference feedback input by permitting individual feedback to be actuated in a single action or in a single transaction at an individual feedback device of the plurality of feedback devices; wherein the plurality of feedback devices are configured to forward the preference feedback to the at least one computer; wherein the single action or the single transaction is actuated by an individual at periodic time intervals, predefined time intervals, random time intervals, substantially random time intervals, at substantially any time, or a combination thereof;

wherein the at least one computer comprises: at least one memory for storing a first set of data comprising at least: (i) the preference feedback from the plurality of feedback devices; (ii) a time corresponding to when the preference feedback was collected; and (iii) how many times a particular one of the plurality of feedback devices collected the preference feedback; and at least one processor for: (i) aggregating the preference feedback from the plurality of feedback devices; and (ii) constructing at least one group preference model based at least in part on at least part of the first set of data and one or more other measured physical parameters, wherein the at least one group preference model is based at least in part on a set of variables that are not directly observable; and (iii) providing instructions based on the at least one group preference model, wherein the instructions provide input to maintain modeled group preferences within a certain range or to move the modeled group preferences towards a certain range while optimizing a predetermined resource.

3. A system comprising:

at least one computer;

a plurality of devices configured to execute instructions, wherein the instructions are provided by at least one computer; and a plurality of feedback devices configured to collect preference feedback input in substantially real time and at a substantially low transaction cost by permitting individual feedback to be actuated in a single action or in a single transaction; wherein the plurality of feedback devices are configured to forward the preference feedback to the at least one computer;

wherein the one single action or one single transaction may be actuated by an individual at periodic time intervals, predefined time intervals, random time intervals, substantially random time intervals or substantially any time; wherein the at least one computer performs one or more of the following:

(a) collects, stores, or a combination thereof, a first set of data comprising one or more of the following: the preference feedback from the plurality of feedback devices; a statistics regarding a time corresponding to when individual preference feedback was collected; a statistics regarding a time period corresponding to when the individual preference feedback was collected; a statistics regarding one or more times corresponding to when a plurality of preference feedbacks was collected; a statistics regarding one or more time periods corresponding to when the plurality of preference feedbacks was collected; and how many times an individual feedback device of the plurality of feedback devices collected the preference feedback;

(b) constructs at least one group preference model based at least in part on at least part of the first set of data and one or more other measured physical parameters, wherein the at least one group preference model is based at least in part on a set of variables that are not directly observable;

(c) provides instructions in periodic time intervals, in real time, in substantial real time or combinations thereof based on the at least one group preference model and on at least one measured physical parameter, wherein the instructions are directed to maintain modeled group preferences within a certain range or to move the modeled group preferences towards a certain range while keeping predetermined resource within predefined range; and (d) corrects, if needed, at least one group preference model based at least in part on at least part of the first set of data and one or more other measured physical parameters, wherein the at least one group preference model is based at least in part on a set of variables that are not directly observable.

4. The system of claim 1 further comprising: a second set of a plurality of feedback devices configured to collect preference feedback input within a second system by permitting individual feedback to be actuated by performing one single action or one single transaction at an individual feedback device of the plurality of feedback devices and the second set of the plurality of feedback devices are configured to forward the collected preference feedback to at least one computer; the at least one computer aggregates the preference feedback from the plurality of feedback devices and constructs at least one group preference model based at least in part on the aggregated feedback and one or more other measured physical parameters, wherein the at least one group preference model is based at least in part on a set of fuzzy variables that are not directly observable; and the at least one computer provides instructions based on the constructed at least one group preference model and those instructions provide input to the second system to maintain group preferences within the second system within a certain range or to move the group preferences within the second system towards the certain range.

5. The system of claim 1, wherein the at least one condition is an environmental condition.

6. The system of claim 5, wherein the environmental condition is a temperature.

7. The system of claim 1, wherein the plurality of feedback devices provide an indication of direction of future movement of the at least one second parameter.

8. The system of claim 1, wherein the plurality of feedback devices provide an indication of direction of future movement of the at least one first parameter.

9. The system of claim 1, wherein the at least one group preference model is defined by one or more of the following: at least one tolerable region, at least one intolerable region, at least one acceptable region and at least one preferred region.

10. The system of claim 1, wherein the at least one group preference model is constructed by aggregating individual preference models.

11. The system of claim 10, wherein the aggregation is done by applying a fuzzy AND function.

12. The system of claim 1, wherein the at least one second parameter is adjusted, based at least in part on the aggregate preference of the plurality of individuals, to an acceptable level for a majority, or a substantial portion, of the plurality of individuals.

13. The system of claim 1, wherein the at least one computer generates and stores information related to the probability of obtaining one or more of the following based at least in part on the aggregate preference of a majority, or a substantial portion of, the plurality of individuals: negative feedback, positive feedback, and neutral feedback.

14. The system of claim 1, wherein the at least one computer is a processor, computing device, computer, cloud based computing resource or combination thereof.

15. The system of claim 1, wherein the at least one computer is the processor, the cloud based computing resource, or a combination thereof.

16. The system of claim 1, wherein the plurality of feedback devices are configured to collect preference feedback input in periodic time intervals, substantially real time, or a combination thereof, at a low transaction cost.

17. The system of claim 1, wherein the plurality of feedback devices are configured to collect preference feedback input at a low transaction cost.

18. The system of claim 1, wherein the single transaction comprises: one, two or three actions.

* * * * *